(12) United States Patent
Park et al.

(10) Patent No.: US 8,848,249 B2
(45) Date of Patent: Sep. 30, 2014

(54) CREATING AN IMAGE TO BE PRINTED USING HALFTONE BLENDING

(75) Inventors: Seong Jun Park, West Lafayette, IN (US); Jan Allebach, West Lafayette, IN (US); Mark Shaw, Meridian, ID (US); George Henry Kerby, Boise, ID (US); Victor D Loewen, Eagle, ID (US); Kurt Robert Bengtson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 13/194,764

(22) Filed: Jul. 29, 2011

(65) Prior Publication Data

US 2013/0027752 A1 Jan. 31, 2013

(51) Int. Cl.
*H04N 1/405* (2006.01)
*H04N 1/40* (2006.01)
*G06K 15/00* (2006.01)

(52) U.S. Cl.
CPC .................. *H04N 1/4055* (2013.01)
USPC ....... 358/3.06; 358/3.28; 358/3.24; 358/3.26; 358/3.2

(58) Field of Classification Search
None
See application file for complete search history.

(56) References Cited

U.S. PATENT DOCUMENTS

| | | | |
|---|---|---|---|
| 5,970,178 A | 10/1999 | Lin | |
| 6,178,011 B1 | 1/2001 | Lin et al. | |
| 6,356,363 B1 * | 3/2002 | Cooper et al. | 358/1.9 |
| 6,563,957 B1 * | 5/2003 | Li et al. | 382/252 |
| 6,760,126 B1 | 7/2004 | Kritayakirana et al. | |
| 6,830,569 B2 | 12/2004 | Thompson et al. | |
| 7,079,287 B1 * | 7/2006 | Ng et al. | 358/2.1 |
| 7,212,315 B2 | 5/2007 | Huang et al. | |
| 7,327,898 B2 | 2/2008 | Fan | |
| 2002/0015162 A1 * | 2/2002 | Hoshii et al. | 358/1.2 |
| 2004/0001642 A1 * | 1/2004 | Curry et al. | 382/260 |
| 2004/0085587 A1 * | 5/2004 | Broddin et al. | 358/3.06 |
| 2005/0030586 A1 * | 2/2005 | Huang et al. | 358/2.1 |
| 2006/0023258 A1 * | 2/2006 | Loce et al. | 358/3.2 |
| 2009/0099980 A1 * | 4/2009 | Ni et al. | 705/400 |
| 2009/0290175 A1 * | 11/2009 | Lee | 358/1.9 |
| 2011/0090537 A1 * | 4/2011 | Fischer et al. | 358/3.2 |

OTHER PUBLICATIONS

Hel-Or, et al., Adaptive cluster dot dithering, J. Electronic Imaging, vol. 8, No. 2, pp. 133-144, 1999.

* cited by examiner

*Primary Examiner* — Marivelisse Santiago Cordero
*Assistant Examiner* — Daryl Jackson

(57) ABSTRACT

A method for creating an image to be printed is provided. A first halftone pattern and a second halftone pattern for respective first and second periodic clustered dot halftone regions of the image are selected. The regions have respective frequencies and one of the frequencies is higher than the other frequency. A transition region is determined. The transition region includes a boundary between the two regions and includes additional portions of the two regions beyond the boundary. The two halftone patterns are blended with each other in the transition region based on a blending ratio of the two halftones where the blending ratio changes as a function of distance between the edges of the transition region.

11 Claims, 18 Drawing Sheets

(b) Blending pair patch sheet (a) Input tone patch sheet

CREATING AN IMAGE TO BE PRINTED USING HALFTONE BLENDING

BACKGROUND

Many tradeoffs are made in order to design printers that are in the cost range that people are willing to pay for. Further, there is a lot of competition among the various manufacturers of printers. In order to get people to buy their printers, each manufacturer adds capabilities to their printers or improves existing capabilities of their printers. One area of interest to manufactures is the quality of images that a printer model is capable of printing.

In laser printing, the laser writes an image to a photo sensitive drum. Then the electro photographic portion of the printing process involves electro statics and field theory, among other things, so that toner is positioned on the desired parts of the paper. At the price ranges that people are willing to pay, there is an inherent degree of instability that results in print artifacts that degrade the quality of the printed image. Therefore, there is a need to increase the quality of the printed image at a cost that people are willing to pay.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "printing," "selecting," "detecting," "including," "blending," "approximating," "using," "obtaining," "applying," "minimizing," "computing," "taking," "controlling," "outputting," "associating," "making," "creating," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as phOcal quantities within the computer system's/device's memories or registers or other such information storage, transmission, or display devices.

Figure 1:
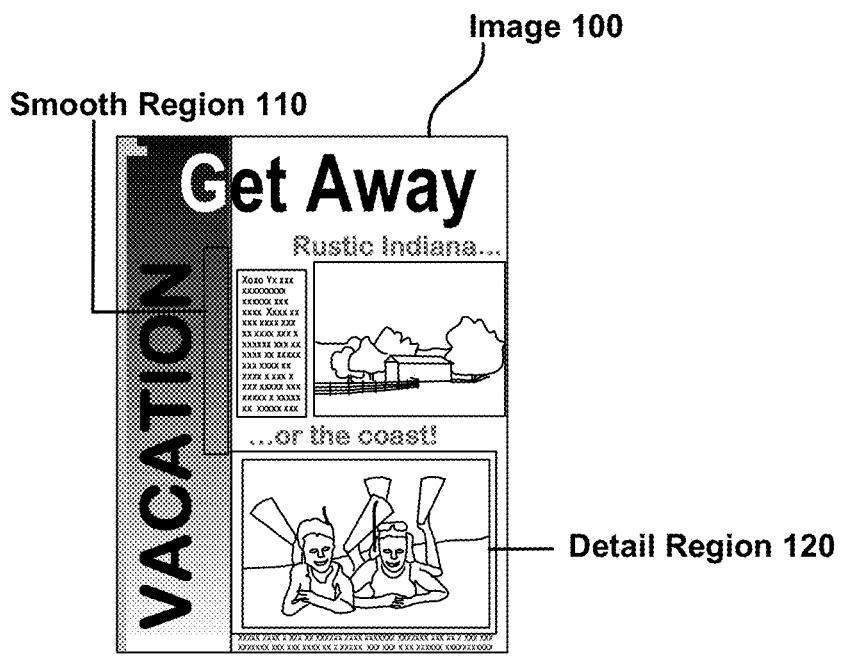
FIG. 1 depicts an image to be printed, according to one embodiment.

While an image, such as a page of a document, is composed of a variety of areas with various image characteristics, the image can be roughly divided, for example, into high frequency regions and low frequency regions. For example, raster regions such as photos or real pictures have high-frequency content, in that the color change is very frequent. These high frequency regions are referred to herein as "detail regions." The background color or gradient regions typically have low-frequency content where the color change may be very slow. Hence, the dominant frequency content in these regions is typically low frequency. The low frequency regions shall be referred to herein as "smooth regions." FIG. 1 depicts an image 100 to be printed where the image 100 includes a smooth region 110 with predominantly low frequency and a detail region 120 with predominantly high frequency, according to one embodiment.

Typically, laser electro photographic printers are inherently unstable because of the speed of the organic photoconductor (OPC) drum in the printer fluctuates resulting in the image being incorrectly printed. Imperfections in the printed image are referred to as "artifacts." Further, the unstable printer operation is more likely to cause visible artifacts in the smooth areas since the color variation is slow in the smooth areas. Examples of artifacts include what is referred to as "banding," "streaks," and "mottle," among other things.

According to one embodiment, object oriented halftoning is used as a part of improving the quality of a printed image. According to one embodiment, an image is divided into smooth and detail regions (also referred to as "objects"), a low line per inch (LPI) screen is applied to the smooth regions 110 and a high LPI screen is applied to the detail regions 120.

Page description languages (PDL) such as PCL, PDF, or postscript have information pertaining to the regions 110, 120 associated with an image 110. This information can be used to generate an object map, which will be represented as o(x,y). Other methods of generating an object map are also well suited.

Generally, a low LPI (lines/per inch) screen can be used to generate a more clustered dot pattern than a high LPI screen. The halftone patterns that are generated from a low LPI screen are less susceptible to variations in OPC speed than halftone patterns that are generated from high LPI screens. However, the halftone patterns for a low LPI screen generally do not provide good print quality for detail regions that have frequent changes in color. Therefore, according to one embodiment, low LPI screens are used in smooth regions 110 to reduce print artifacts and high LPI screens are used in detail regions 120 to preserve detailed rendition. According to one embodiment, the regions 110, 120 can be either periodic clustered dot halftoned regions or periodic line screen regions.

According to one embodiment, seamless halftoning is provided where the halftone patterns for a detail region 120 and a smooth region 110 are blended together in a transition region. The regions 110, 120 are periodic clustered dot halftone regions where one 120 of the regions has a higher frequency than the other 110. According to one embodiment, the two halftone patterns are selected harmonically. The transition region has a fixed width and includes a boundary between detail and the smooth regions and includes additional portions of the respective detail and smooth regions 110, 120, according to one embodiment. The two halftone patterns are blended in the transition region based on a blending ratio of the two halftone patterns that changes as a function of distance between the edges of the transition region, according to one embodiment.

Various embodiments pertaining to blending in the transition region, a description of the screening process, halftone texture blending, selection of halftone patterns, controlling blending strength in the transition region, and a printer friendly implementation using a low resolution approach shall follow.

According to one embodiment, at least two screens are used respectively for a detail region and a smooth region where the resulting two halftone patterns meet at a boundary. Due to the different textures of the two halftone patterns, ragged patterns occur along the boundary referred to herein as "boundary artifacts."

According to one embodiment, seamless halftoning is used to reduce or remove boundary artifacts. For example, a transition region is used to blend the two halftone patterns produced respectively by the smooth and detail screens.

Figure 2:
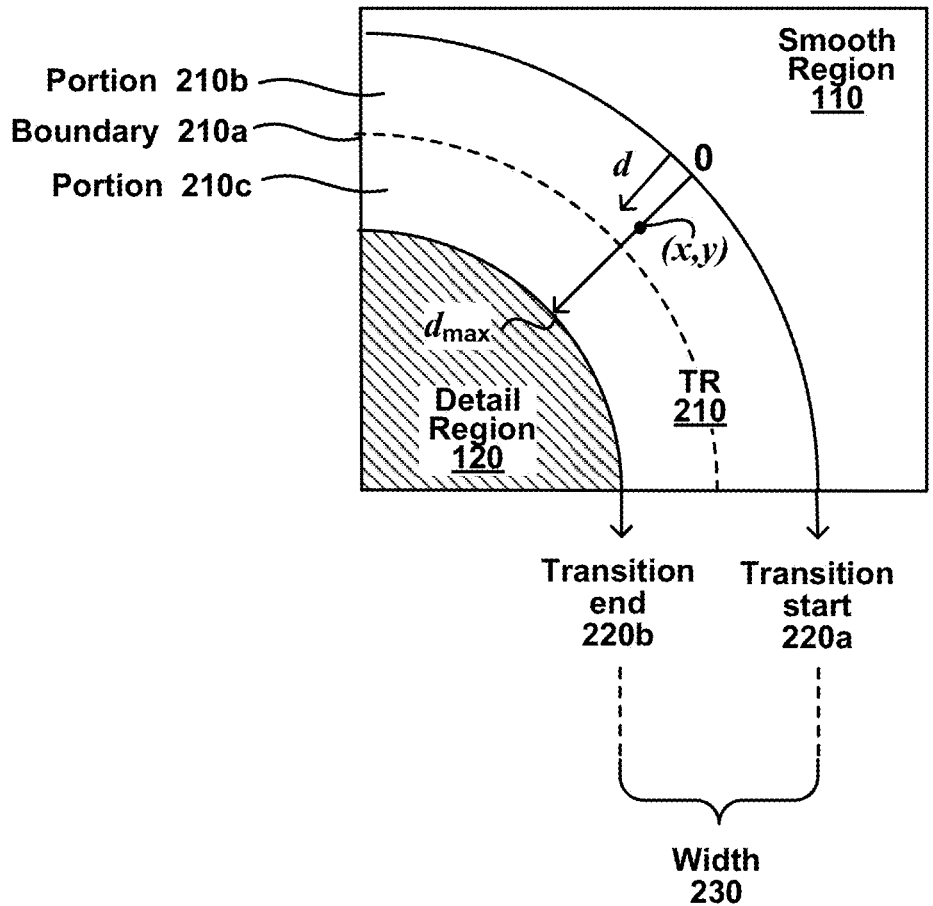
FIG. 2 depicts a transition region between smooth and detail regions, according to one embodiment.

FIG. 2 depicts a transition region between smooth and detail regions, according to one embodiment. FIG. 2 depicts a smooth region 110, a detailed region 120, a boundary 210a between the smooth and detail regions 110, 120, a transition region 210, portions 210b, 210c of the transition region 210, two edges 220a, 220b of the transition region where one is used as a transition start 220a and the other is used as a transition end 220b, a width 230 of the transition region 210, a current processing pixel (x,y), and a distance d from a transition start 220a.

According to one embodiment, at each location along the boundary 210a, the boundary 210a can include one pixel from the smooth region 110 and one pixel from the detail region 120.

The transition region 210, according to one embodiment includes the boundary 210a and two additional portions 210b, 210c that are subsets respectively of the smooth and detail regions 110, 120. The widths of the two additional portions 210b, 210c are the same, according to one embodiment, resulting in what is referred to as "a symmetrical transition region." According to one embodiment, a symmetrical transition region saves memory by reducing the window size that is used to search for the boundary 210a.

The transition region 210 has the same width 230 along the entire boundary 210a between the smooth and detail regions 110, 120, according to one embodiment, which is referred to as a "fixed width." The width 230 is also referred to as the maximum distance $d_{max}$, which is the maximum value for d when the current processing pixel (x,y) reaches the transition end 220b. According to one embodiment, the width 230 of the transition region 210 can be any value between 6 pixels and 16 pixels. The transition region 210 can be located in two normal directions with respect to the boundary 210a, according to one embodiment.

According to one embodiment, the two halftone patterns associated respectively with the smooth and detail regions 110, 120 are blended in the transition region 210 based on a blending ratio of the two halftone patterns that changes as a function of distance d between the edges 220a, 220b (transition start and transition end) of the transition region 210. For example, as depicted in FIG. 2, the halftone patterns can be blended starting at one edge referred to as the transition start 220a and ending at the other edge referred to as the transition end 220b. Although the blending can start at either edge 220a, 220b, for the sake of illustration, various embodiments shall be described using the edge 220a nearest the smooth region 110 as the start of the transition.

As depicted in FIG. 2, d is defined as the distance from the transition start 220a to the processing pixel position (x, y). In the transition region 210, the ratio of the low and high LPI halftone patterns is changed gradually, according to one embodiment. For example, at the transition start 220a, only the smooth halftone pattern is used and as the distance d increases due to the processing proceeding across the transition region 210, the strength of the smooth halftone pattern for the smooth region 110 is reduced and the strength of the detail halftone pattern for the detail region 120 is increased. At the boundary 210a of the transition region 210, the strengths of the smooth and detail halftone patterns are equal. Finally, the transition end 220b is reached when $d=d_{max}$. At this point, only the detail halftone pattern is used, and none of the smooth halftone pattern is used.

According to one embodiment, a Sobel operator is used as a part of detecting the boundary 210a between the smooth and detail regions 110, 120. The Sobel operator is well known as a boundary detection tool. As discussed herein, an object map can be generated from information associated with page description languages (PDL), such as PCL, PDF, or Postscript. A Sobel operator can be applied to the object map o(x, y) as depicted in Table 1 below:

TABLE 1

Sobel Operator $$S_v = \begin{bmatrix} -1 & 0 & 1 \\ -2 & 0 & 2 \\ -1 & 0 & 1 \end{bmatrix}, S_h = \begin{bmatrix} -1 & -2 & -1 \\ 0 & 0 & 0 \\ 1 & 2 & 1 \end{bmatrix}, \quad (1)$$

According to one embodiment, a neighborhood window for each pixel (also referred to as a(x,y)) is set to 3×3. Further, according to one embodiment, the gradients $G_v$ and $G_h$ are computed as depicted in equation 2 below:

$$G_v(x,y) = S_v \otimes_a(x,y), G_h(x,y) = S_h \otimes_a(x,y) \quad (2)$$

where $A \otimes B$ is defined as the operation of pair wise multiplication of the elements of the two matrices A and B, followed by a sum of the resulting product terms. The boundary map b(x,y) is defined by the following equation 3, according to one embodiment.

$$b(x, y) = \begin{cases} 1, & \text{if } G_v(x, y)^2 + G_h(x, y)^2 > T \\ 0, & \text{else} \end{cases} \quad (3)$$

In equation 3, T is the threshold for deciding whether or not a boundary 210a exists. Accordingly to one embodiment, the pixels on either side of the boundary pixels between a smooth region 110 and a detail region 120 will generally be assigned a value of 1 in the boundary map b(x,y).

To compute the distance d from the transition start 220a to the processing pixel's position (x,y), an input image f(x,y), an object map o(x,y), and boundary map b(x,y) are used as inputs. According to one embodiment, the position of the transition start 220a is not known. In this case, the boundary position from b(x,y) can be used. The distance $d_b$ between the nearest boundary point and the current processing position (x,y) is computed. Then the distance d between the transition start 22a (FIG. 2) and the current processing pixel (x,y) can be determined based on o(x,y) and $d_b$. The possible d values are defined as a set of d={0, 1, 2 ... $d_{max}$−1} so that the location of the transition start 220a is associated with d=0 and the location of the transition end 220b is associated with d=$d_{max}$−1.

As discussed, according to one embodiment, the boundary 210a includes a pixel from the smooth region 110 and a pixel from the detail region 120. In this case, the distance between smooth side boundary pixel and the transition start is $d_s$=$d_{max}$/2−1 and the distance between detail side boundary pixel and the transition start is $d_d$=$d_{max}$/2. When there are two boundary pixels and the widths of the additional portions 210b, 210c on each side of the boundary 210a are the same, $d_{max}$ will be an even number, according to one embodiment.

According to one embodiment, the distance between two pixels $(x_1,y_1)$ and $(x_2,y_2)$ is computed using the Euclidean distance defined by $d=\sqrt{(x_1-x_2)^2+(y_1-y_2)^2}$. According to one embodiment, instead of directly computing Euclidean distance, a pre-computed distance window W is used, which it is better suited to hardware implementation. The pre-computed distance window W can be used to compute $d_b$. Since, according to one embodiment, $d_b$ cannot be greater than $d_s$, the size of the window can be set as $\{d_s^2-1\} \times \{d_s^2+1\}$. The center entry of W, $(d_s,d_s)$ corresponds to the processing pixel position (x,y) and each entry value of the pre-computed distance window W is the Euclidean distance from the processing pixel's position (x,y). Since, according to one embodiment, only integers are used for computing the distance d, and distance values greater than d, are not needed because of $d_b \le d_s$, according to one embodiment, each entry value of W is defined as follows in equation 4, $$w_{i,j} = \begin{cases} \left[\sqrt{(i-d_s)^2 + (j-d_s)^2}\right]_R, & \text{if } \sqrt{(i-d_s)^2 + (j-d_s)^2} \le d_s \\ d_{max}, & \text{else} \end{cases} \quad (4)$$

where, i=0, 1, 2 ... $d_s$, j=0, 1, 2 ... $d_s$

The operation $[z]_R$ in equation 4, denotes rounding of the argument z to the nearest integer.

Figure 10:
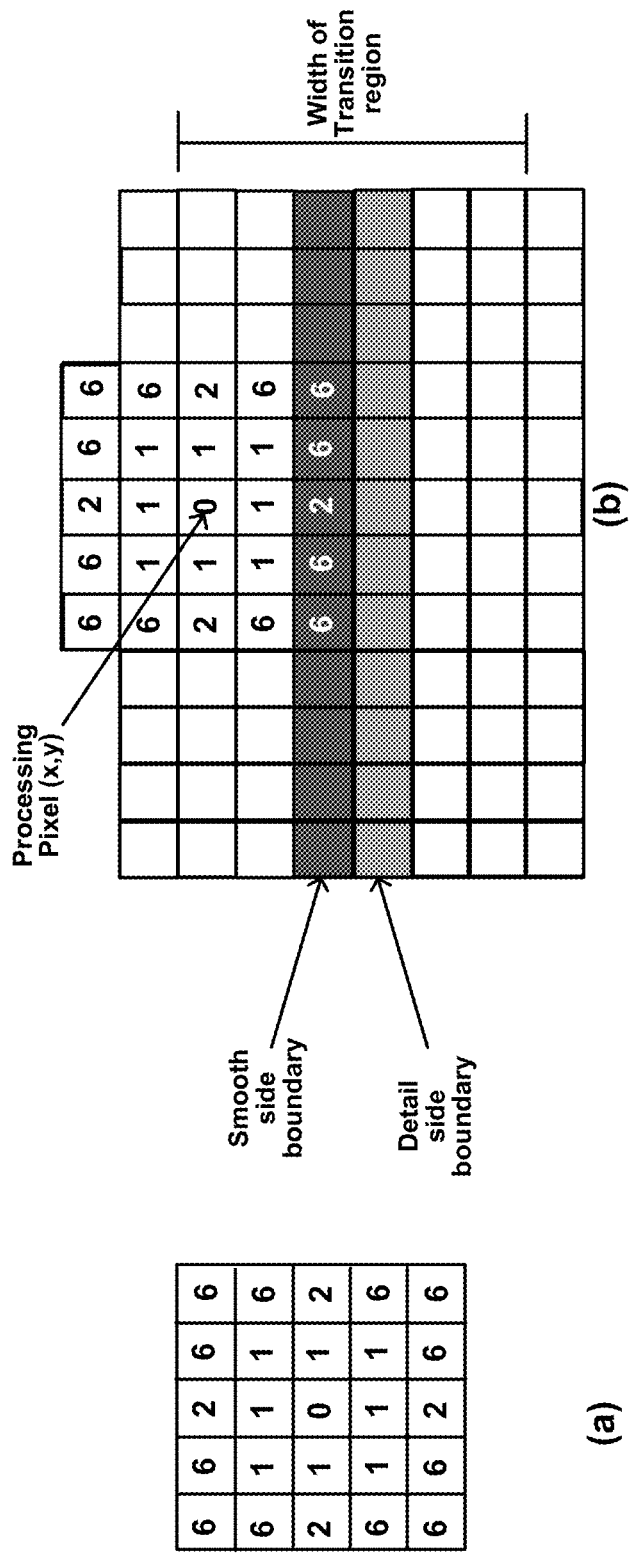
FIG. 10 depicts an example of a distance window ($d_{max}=6$), according to one embodiment.

FIG. 10 depicts an example of a distance window ($d_{max}$=6), according to one embodiment. In the following example depicted in FIG. 10, we assume that the maximum distance $d_{max}$=6 pixels. The corresponding size of the pre-computed distance window W for this illustration is 5×5, and the entry value of W is denoted at (a) in FIG. 10.

As depicted in FIG. 10, the first row (a) and (b) depict 6, 6, 2, 6, 6, the second row of (a) and (b) depict 6, 1, 1, 1, 6, the third row depicts 2, 1, 0, 1, 2. The fourth row depicts 6, 1, 1, 1, 6, and the fifth row depicts 6, 6, 2, 6, 6, according to one embodiment. FIG. 10 depicts in (b), that the sixth row is on the smooth side of the boundary 210a and a row after the sixth row is on the detail side of the boundary 210a, when for example, a distance window of $d_{max}$ is 6 pixels wide.

The results denoted at (b) in FIG. 10 depicts the results of applying the distance window to compute $d_b$, according to one embodiment. For example, the pre-computed distance window W is located on the boundary map b(x,y). The entries of the pre-computed distance window W which overlap the boundary pixel can be found. Among them, the minimum value becomes $d_b$, according to one embodiment.

Next, the distance d decision process based on $d_b$ and the object map o(x,y) can be computed. For example, the decision process base $d_b$ can have one value among 0, 1, 2 ..., $d_s$, or $d_{max}$. The object map o(x,y) can have a value between smooth region 110 and the detail region 120, which are presented respectively in Table 3 as (S) and (D). The object map o(x,y), the smooth region 110 and the detail region 120 are used as inputs, according to one embodiment. Corresponding outputs are depicted in a distance lookup table (LUT) in Table 3 below. The distance LUT in Table 3 also depicts outputs that indicate the method of the halftone texture blending process to be used. For example, if d=$d_{max}$ or d=−1, the processing pixel is not in the transition region 210, so only smooth or detailed halftoned textures will be used appropriately depending on whether processing is in the smooth region 110 or the detail region 120. If 0≤d≤$d_{max}$, a distance d is computed so that it is increased from transition start 110 associated with the smooth region 1120 and is used for blending in the transition region 210. According to one embodiment, whereas FIG. 10 applies to a specific embodiment where $d_{max}$=6, Table 3 is valid for any value of $d_{max}$.

TABLE 3 distance lookup table for distance d.

| Input | | Output |
|---|---|---|
| $d_b$ | o(x, y) | d |
| $d_{max}$ | S | −1 |
| 0 | S | 0 |
| 1 | S | 1 |

TABLE 3-continued distance lookup table for distance d.

| Input | | Output |
|---|---|---|
| $d_b$ | o(x,y) | d |
| 2 | S | 2 |
| . | S | . |
| . | | . |
| . | | . |
| $d_s$ | S | $d_s$ |
| $d_s$ | D | $d_s + 1$ |
| $d_s - 1$ | D | $d_s + 2$ |
| . | D | . |
| . | | . |
| . | | . |
| 1 | D | $d_{max} - 2$ |
| 0 | D | $d_{max} - 1$ |
| $d_{max}$ | D | $d_{max}$ |

Various aspects of the screening process and various terminologies shall be discussed next. Typically, color images that have already been converted into separations will be processed where there is one separation for each colorant channel. The colorant channels typically include cyan, magenta, yellow, and black. The object oriented halftoning process and the halftone blending process operate separately and independently on each colorant channel, according to one embodiment. Therefore, various embodiments shall be described in the context of a single channel, which could be any one of cyan, magenta, yellow, or black.

According to one embodiment, the separations will be different for each channel; and the halftone screens used for each channel will also be different; but the structure of the object-oriented hafltoning process and the halftone blending process can be the same for all the colorant channels.

Let f(x,y) represent the continuous-tone image for one colorant channel. The continuous-tone image f(x,y) will be halftoned, according to one embodiment. Frequently there are 256 continuous tone levels for each color channel. Therefore, assuming there are 256 continuous tone levels for each color channel, at each pixel location (x,y), a halftoned texture will have a value between 0 and 255, where 0 denotes no colorant, or the color of the media, such as paper, linen, among other things; and 255 denotes the maximum amount of the colorant, such as cyan, magenta, yellow, or black.

Let h(x,y) represent the final halftone image that results from the screening process. At each pixel location (x,y), the final halftone image h(x,y) can have a value 0 (no colorant) or 255 (maximum colorant). By setting the half tone image h(x,y) to the value 255 in spatially contiguous clusters of pixels and 0 elsewhere, a halftone pattern is obtained, according to one embodiment, which can be used to stably print with the laser electrophotographic process. However, laser printers also commonly have the capability to write a portion of a pixel where the portion is located in the center of the pixel, to the left of the pixel, to the right of the pixel or is split within the pixel. The capability of writing a portion of a pixel is known as pulse-width modulation (PWM) and can provide improved definition of the halftone dot cluster shape.

Improved definition of the halftone dot cluster shape can also be achieved by modulating the intensity of the laser beam within each pixel to generate a value that is nearly constant within each pixel, but which varies from pixel to pixel, referred to herein as "modulating the intensity." When a printer has the capability to modulate laser pulse-width or laser intensity, each pixel of the halftone image can take on n values uniformly spaced between 0 and 255 that represent the ideal colorant amount that is put on a media, such as paper, at that pixel location, according to one embodiment. In the implementation of an imaging pipeline for a printer, this information may be encoded at each pixel (x,y) as $\log_2(n)$ binary digits of information. According to one embodiment, it is assumed that n is a power of 2, along with pulse justification information in the case of pulse-width modulation.

According to one embodiment, a set of threshold functions are used as a part of defining a halftone screen. In this case, let $t_i(x,y), i=0, 1, 2, \ldots n-2$ denote the set of threshold functions that define the halftone screen. Because the halftone image h(x,y) has n values, it can be determined by the following equation 5.

$$h(x, y) = \begin{cases} 0, & 0 \leq a \leq t_0(x, y) \\ \left[255 \frac{i}{n-i}\right]_R, & t_{i-1}(x,y) \leq a \leq t_i(x,y), i = 1, 2, \ldots n-2 \\ 255, & a > t_{n-2}(x, y) \end{cases} \quad (5)$$

where the parameter a denotes the value of the continuous-tone input image at pixel location (x,y), where a=f(x,y); and the operation $[z]_R$ denotes rounding of the argument z to the nearest integer.

According to one embodiment, a selection between the smooth and detailed halftone patterns is performed at each pixel in order to blend them in the transition region 210 (FIG. 2) according to a desired absorptance.

$$g(x,y) = \max\{h^{(S)}(x,y), h^{(D)}(x,y)\} \quad (6)$$

Equation 6 is a mathematical expression to describe the halftone texture blending process, according to one embodiment. The max{.} is an operation for selecting between the smooth halftone texture $h^{(S)}(x,y)$ and the detail halftone texture $h^{(D)}(x,y)$. The halftone patterns $h^{(S)}(x,y)$ and $h^{(D)}(x,y)$ are separately generated using Equation 5 with smooth and detail screens $t_i^{(S)}(x,y)$, i=0, 1, ..., n-2 and $t_i^{(D)}(x,y)$, i=0, 1, ..., n-2, respectively, according to one embodiment. However, the input continuous-tone gray level a used to generate the smooth and detail halftone patterns may not be the same as the continuous-tone image value f(x,y) at the pixel location (x,y). Therefore, according to one embodiment, two modified continuous-tone values $a^{(S)}$ and $a^{(D)}$ are used respectively to generate the smooth and detailed halftone patterns $h^{(S)}(x,y)$ and $h^{(D)}(x,y)$. According to one embodiment, using the modified continuous-tone values $a^{(S)}$ and $a^{(D)}$ provides the desired locally averaged gray value across the transition region 210 (FIG. 2). According to one embodiment for generating the modified continuous-tone values, $a^{(S)}$ is a modified continuous-tone value associated with the smooth halftone pattern and $a^{(D)}$ is a modified continuous-tone value associated with the detail halftone pattern.

Figure 11:
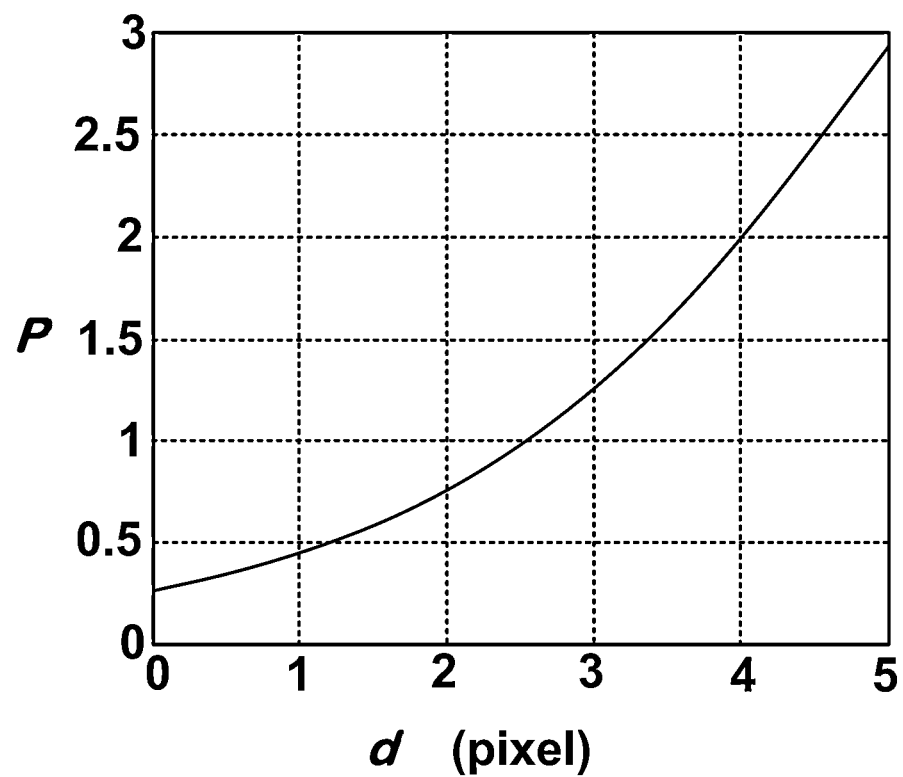
FIG. 11 depicts a graph of a ratio function, according to one embodiment.

According to one embodiment, the blending pair ($a^{(S)}, a^{(D)}$) for the half tone blending procedure is selected according to two factors: (1) the relative strength of the smooth and detail halftone patterns $h^{(S)}(x,y)$, $h^{(D)}(x,y)$; and (2) the locally averaged gray value. The value of the original continuous-tone image at the currently processed pixel (x,y) shall be referred to as a=f(x,y). After blending, the locally averaged value of the halftone image retains the value a, according to one embodiment. The ratio of the strength of the smooth and detail halftone patterns $h^{(S)}(x,y)$, $h^{(D)}(x,y)$ is changed in a way that varies according to a predetermined ratio curve ρ as a function of d, according to one embodiment, as depicted in FIG. 11. FIG. 11 depicts a graph of a ratio function, according to one embodiment.

According to one embodiment, the ratio curve ρ is defined as $\rho(d)=a^{(D)}/a^{(S)}$. In this case, as depicted in FIG. 11, if pixel distance from the transition start d is 0 pixels, $\rho(0)=a^{(D)}/a^{(S)}=1/3$, which indicates that the ratio of $(a^{(S)}, a^{(D)})$ is $a^{(S)}:a^{(D)})=3:1$. Because in this illustration, when d=0, processing is close to the smooth region 110, the dominant halftone pattern would be the smooth halftone pattern $h^{(S)}(x,y)$. However in this illustration, when the distance d=5 pixels, processing is close to the detail region 120. In this case, $\rho(5)=a^{(D)}/a^{(S)}=3$, and, therefore $a^{(S)}:a^{(D)}=1:3$, according to one embodiment. Then, the dominant halftone pattern would be the detail halftone pattern $h^{(D)}(x,y)$.

According to one embodiment, a larger value for the width 230, which is also the maximum distance $d_{max}$, can provide a more natural blending pattern. However, a larger value for $d_{max}$ may require a larger boundary search window, which in turn may increase memory usage and the cost to build the hardware. Therefore, for the sake of illustration, the maximum distance will be $d_{max}=6$ pixels. Next, a ratio ρ function is determined. For example if ρ=1 at all distances d between the transition start 220a and the transition end 220b, the blending halftone pattern in the transition region 210 may change abruptly. Changing the blended halftone pattern quickly may result in what is known as a halo print artifact where the boundary tone becomes brighter or darker. Empirical observation has indicated that best quality can be achieved when $\rho(d)=0.107d^2+0.333$, according to one embodiment. In this case, $\rho(0)=1/3$, $\rho(2.5)=1$, and $\rho(5)=3$; so that it changes from 1/3 to 3.

As discussed herein, T(a) is used to represent the measured tone absorptance value that results when a nominal gray level a is printed using the smooth halftone screen with no blending. Similarly, $T_{blend}(a^{(S)},a^{(D)})$ represents the measured tone absorptance value that results when a pair of nominal gray levels or the blending pair $(a^{(S)},a^{(D)})$ is input to the blending process described above, and printed. According to one embodiment, it is desired that the measured absorptance value $T_{blend}(a^{(S)},a^{(D)})$ be the same as that which would result with no blending, i.e. T(a); and that the ratio of $a^{(S)}$ and $a^{(D)}$ be $\rho(d)=a^{(D)}/a^{(S)}$.

According to one embodiment, the blending pair parameters $(a^{(S)},a^{(D)})$ to satisfy the above two factors at the same time cannot always be determined. In this case, a cost function C is determined, and for each pair (a,d), a blending pair $\theta=(a^{(S)},a^{(D)})$ is found that minimizes the cost function $C=\Phi+\Psi$, where Φ represents the tone reproduction error cost and Ψ represents the ratio error cost. The blending pair $\hat{\theta}$ that minimizes the cost function can be written as depicted in equation 7 below:

$$\hat{\theta}(a, d) = \arg\min_{\theta} C(\theta \mid a, d) \quad (7)$$

where d is the distance from the transition start 220a, and a represents the original continuous-tone image at location (x,y).

Therefore, according to one embodiment, $\hat{\theta}$ provides the optimal blending pair that minimizes the cost function C.

All blending pairs $(a^{(S)},a^{(D)})$ based on (a,d), can be obtained and saved in a blending lookup table (LUT) as depicted at Table 5 that represents the relation between the blending pairs $(a^{(S)},a^{(D)})$ and (a,d).

TABLE 5

Blending LUT.
$(a^{(S)}, a^{(D)})$ LUT table

|   |     | d         |           |           |           |            |            |
|---|-----|-----------|-----------|-----------|-----------|------------|------------|
|   |     | 0         | 1         | 2         | 3         | 4          | 5          |
| a | 0   | (0, 0)    | (0, 0)    | (0, 0)    | (0, 0)    | (0, 0)     | (0, 0)     |
|   | 1   | (6, 1)    | (4, 1)    | (2, 1)    | (3, 4)    | (0, 1)     | (0, 2)     |
|   | .   | .         | .         | .         | .         | .          | .          |
|   | .   | .         | .         | .         | .         | .          | .          |
|   | .   | .         | .         | .         | .         | .          | .          |
|   | 127 | (95, 30)  | (81, 38)  | (68, 47)  | (57, 68)  | (38, 81)   | (30, 81)   |
|   | 128 | (95, 30)  | (95, 30)  | (68, 57)  | (57, 68)  | (38, 81)   | (30, 81)   |
|   | .   | .         | .         | .         | .         | .          | .          |
|   | .   | .         | .         | .         | .         | .          | .          |
|   | .   | .         | .         | .         | .         | .          | .          |
|   | 254 | (255, 81) | (255, 110)| (255, 206)| (184, 255)| (144, 255) | (95, 255)  |
|   | 255 | (255, 81) | (255, 95) | (255, 184)| (206, 255)| (126, 255) | (95, 255)  |

Table 5 shows $(a^{(S)},a^{(D)})$ when a=127. Normally a has the 256 values from 0 to 255, according to one embodiment, as illustrated in Table 5.

According to one embodiment, a=f(x,y) where f(x,y) is the original continuous-tone image and a represents the value of the original continuous-tone image at pixel location (x,y). Further, as discussed herein, for a specific pixel location (x,y), the distance d can be computed from the boundary map and the object Map. Therefore, according to the blending LUT as depicted in Table 5, a blending pair $(a^{(S)},a^{(D)})$ can be selected and an output pixel value g(x,y) at location (x,y) can be obtained using equation 6.

Figure 3:
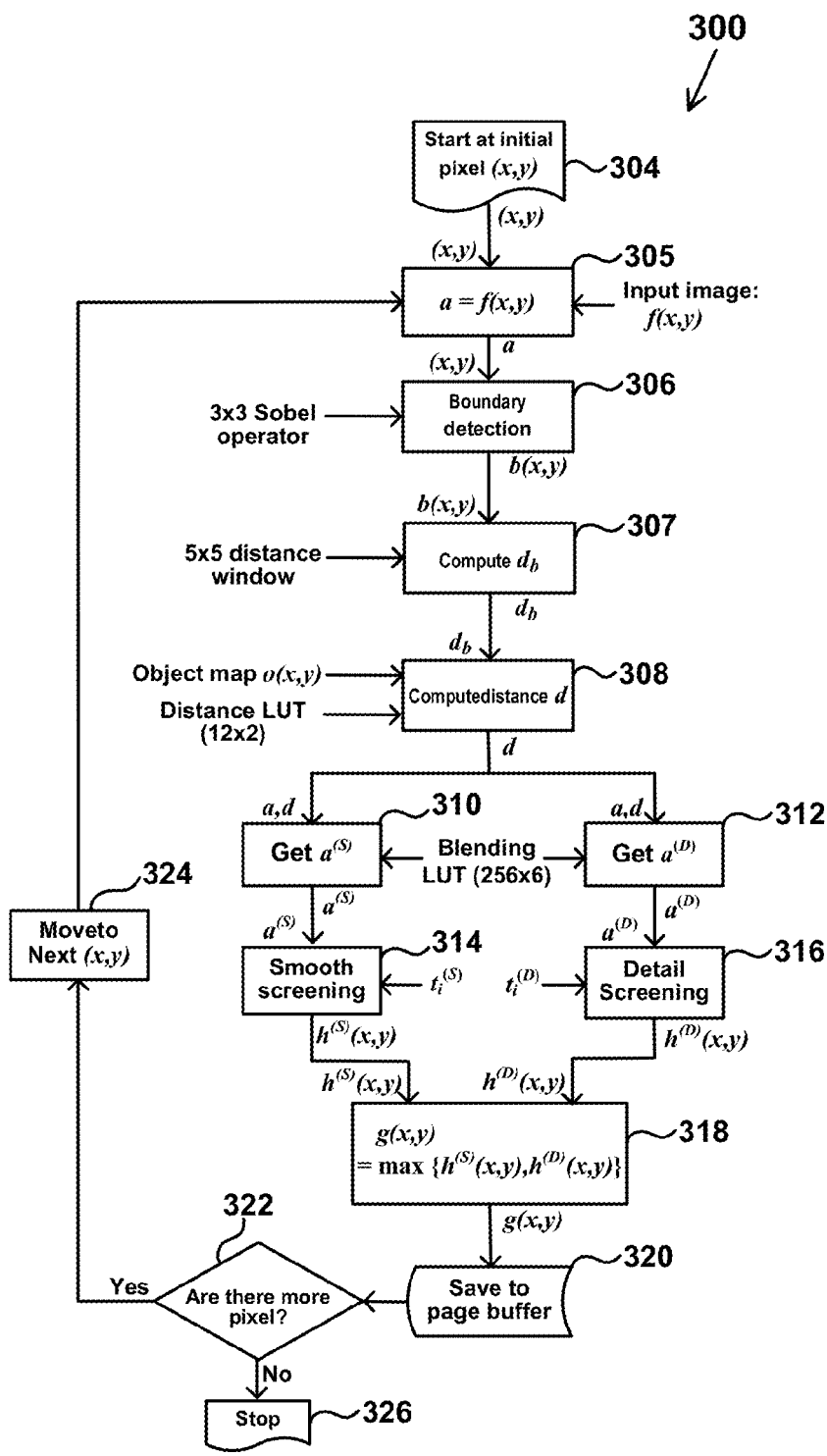
FIG. 3 depicts a flow chart for a halftone texture blending method, according to various embodiments.

FIG. 3 depicts a flow chart 300 for a halftone texture blending method, according to various embodiments. According to one embodiment, the halftone texture blending method uses blending pairs $(a^{(S)},a^{(D)})$ obtained, for example, from a distance lookup table as depicted in Table 5.

As depicted in FIG. 3, the text on the left side of each arrow indicates an input and the text on the right of each arrow indicates an output for each of the respective blocks.

The method starts at 304, where the current pixel location (x,y) is set to the initial pixel location. At each of the iterations of the loop formed by 305-324, the current pixel location (x,y) will be moved to the next pixel location at 324.

The output of 304 is the current pixel location (x,y) and the input to 305 is the current pixel location (x,y). At 305, the continuous-tone image f(x,y) is received as input. The output of 305 is the gray value a of the continuous-tone image f(x,y) at the current pixel location (x,y), which is received at 306.

306 also receives a Sobel operator, according to one embodiment, as depicted in Table 1. At 306, the boundary 210a is detected using equation 3 to determine the boundary map b(x,y). The boundary map b(x,y) is received at 307. 307 also receives a 5×5 distance window, according to one embodiment. However, other dimensions for the distance window are also suitable. At 307, the distance $d_b$ is calculated using the operator shown in FIG. 10. The distance $d_b$, the object map o(x,y) and the distance LUT as depicted in Table 3, are received at 308. As discussed herein, the object map o(x,y) can be generated from information obtained from a page description language associated with an image 100 (FIG. 1). At 308, the distance d is calculated from Table 3.

The distance d is then received at 310 and 312. A blending LUT, as depicted in Table 5, is also received at 310 and 312. Referring respectively to 310 and 312, the values for the respective blending pair $a^{(S)}$, $a^{(D)}$ are calculated as follows, according to various embodiments: $a^{(S)}=0$ and $a^{(D)}=a$ when $d=-1$ and $a^{(S)}=a$ and $a^{(D)}=0$ when $d=d_{max}$, lastly $a^{(S)}$ and $a^{(D)}$ are determined by the blending LUT when $0 \le d \le d_{max}-1$.

The respective outputs of 310 and 312 are the blending pair $a^{(S)}, a^{(D)}$. The blending pair $a^{(S)}$, $a^{(D)}$ is received as input into respective blocks 314 and 316. Blocks 314 and 316 also receive the halftone screens $t_i^{(S)}$ and $t_i^{(D)}$. According to one embodiment, blocks 314 and 316 generate the halftone patterns $h^{(S)}(x,y)$ and $h^{(D)}(x,y)$ using equation 5, for example. At 318, the halftoned patterns are received and an output pixel value g(x,y) for the current pixel location (x,y) is calculated using equation 6, according to one embodiment, to select between the smooth and detail halftone patterns $h^{(S)}(x,y)$ and $h^{(D)}(x,y)$ at the current processing pixel (x,y) where according to one embodiment, the maximum of the smooth and detail halftone patterns $h^{(S)}(x,y)$ and $h^{(D)}(x,y)$ is selected at (x,y).

According to one embodiment, at each pixel (x,y) in the transition region 210 (FIG. 2), an output pixel g(x,y) is computed by taking the maximum of the smooth halftone pattern $h^{(S)}(x,y)$ and the detail halftone pattern $h^{(D)}(x,y)$ using a blending pair $(a^{(S)},a^{(D)})$ from the blending LUT as represented in Table 5, according to one embodiment. This blending LUT is designed, for example, via an offline process that minimizes a cost function C that is the sum of the tone reproduction error cost Φ and the ratio error cost Ψ according to equation 7. The pixel value g(x,y) is the output of 318 and is saved to memory, such as a page buffer at 320. At 322, a determination is made as to whether there are more pixels to be processed. If the current pixel at (x,y) is not the last pixel, the location of the current pixel is moved to the next pixel at 324 and processing proceeds to 305. If the current pixel at (x,y) is the last pixel, processing ends at 326.

According to one embodiment, to this point among other things, the on-line processing has been described that defines how the page image, originally represented by the PDL, is transformed, after rasterization, to a halftone rendering, according to various embodiments. This on-line processing can be implemented in the hardware of a printer, for example, as an application-specific integrated circuit (ASIC), software or firmware that runs on an embedded processor in a printer, or as software executed on a host printer in a printer drive, among other things. According to one embodiment, off-line processing shall now be described whereby the halftone blending LUT as depicted in Table 5 and halftone screens are designed, as will become more evident.

According to one embodiment, the nominal pixel gray value or absorptance, and distance are two factors that are used as a part of creating a blending LUT, for example, as depicted in Table 5. First for absorptance, the absorptance cost function Φ is computed, according to one embodiment. The absorptance cost function Φ, according to one embodiment, is the absolute difference between the measured tone absorptance when there is no blending and the measured tone absorptance of the blended result.

Figure 12:
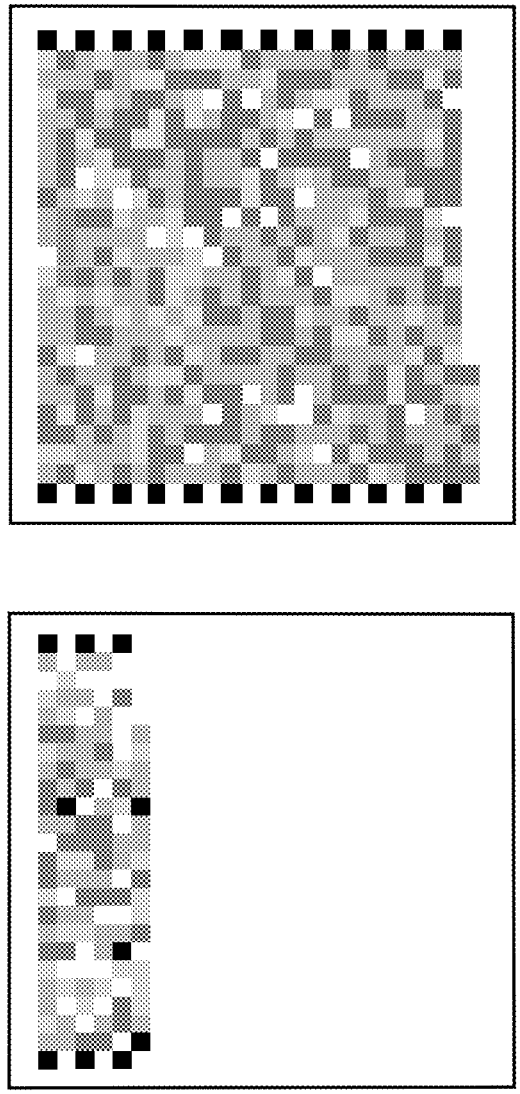
FIG. 12 depicts two patch sheets used to design the blending LUT, according to one embodiment.

To determine the values stored in the blending LUT, two patch sheets may be prepared, according to one embodiment. These patch sheets may be created based on a population of printers for a given model and then used to calibrate printers before they are sold. The two patch sheets may include the original input tone a patches, and the blended result for the blending pairs $(a^{(S)}, a^{(D)})$, according to one embodiment. FIG. 12 depicts two patch sheets used to design the blending LUT, according to one embodiment. One (a) is the input tone patch sheet and the other (b) is the blending pair patch sheet, according to one embodiment.

Figure 4:
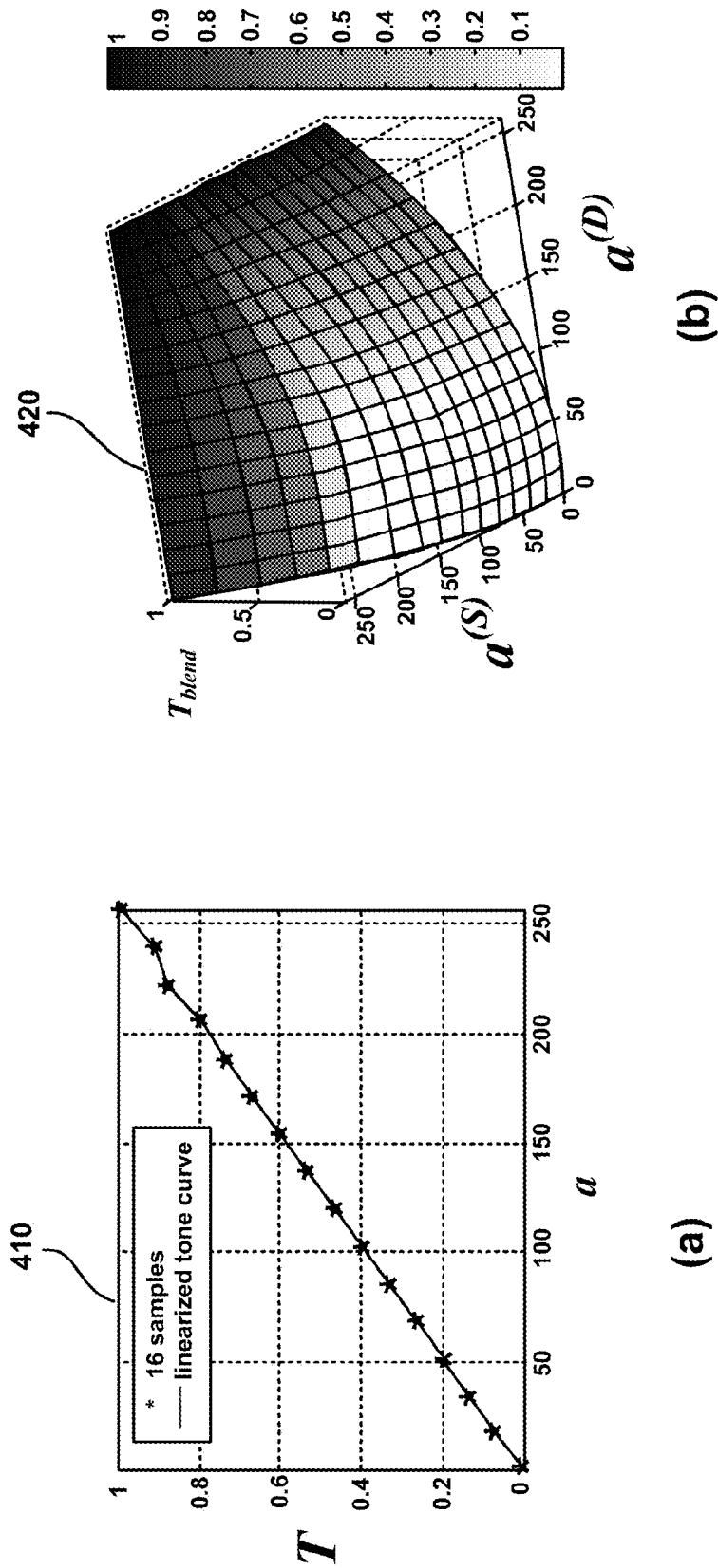
FIG. 4 depicts original tone patch absorptance and blending pair patch absorptance, according to one embodiment

FIG. 4 depicts measured original tone patch absorptance 410 and the measured blending pair patch absorptance 420, according to one embodiment. According to one embodiment, the graph of the original tone patch absorptance 410 is a graph of 16 values for the parameter a that denotes the measured value of the continuous-tone input image f(x,y) at pixel location (x,y) when halftoned without blending and printed. According to one embodiment, the graph of blending pair patch absorptance 420 is a graph of the measured value when halftoned and printed with blending using the modified continuous-tone values $a^{(S)}$ and $a^{(D)}$) associated, respectively, with the smooth half tone pattern and the detail halftone pattern.

A spectrophotometer, such as the X-Rite DTP70, can be used to measure the absorptance of the patch sheets as depicted in FIG. 12 that are used to determine the original tone patch absorptance 410 and the blending pair patch absorptance 420 (FIG. 4). Typically, the number of continuous tone levels for each color channel is 256. For the sake of illustration, assume that the original input tone level may be set to one of 256 values. In this case, there are 256×256=65536 unique combinations of blending pairs. According to one embodiment, the size of the training set and the blending tone pairs is reduced, for example, so that the size of the training set number is 16 input tones as depicted in 410 and there are 25×25=625 blending tone pairs as depicted in 420. The absorptance of the 16 input tones that are printed can be measured. For the other 256−16=240 input tones, the absorptance can be estimated by linear interpolation.

For example, the spectrophotometer can provide the color value $(L_p^*, a_p^*, b_p^*)$ for each blending pair associated with 420, so that the Euclidean distance $\Delta E = \sqrt{(L_p^* - L_w^*)^2 + (a_p^* - a_w^*)^2 + (b_p^* - b_w^*)^2}$ can be obtained from the color value $(L_w^*, a_w^*, b_w^*)$ of the white point to each patch. According to one embodiment, the Euclidean distance is used as the measured absorptance. The measured original tone patch absorptance 410 is represented as T(a), and the measured absorptance of the blending pair patch 420 is represented as $T_{blend}(a^{(S)}, a^{(D)})$. In this case, according to one embodiment, the absorptance cost function Φ can be expressed using equation 8 below:

$$\Phi = \Phi(a^{(S)}, a^{(D)}|a) = \|T(a) - T_{blend}(a^{(S)}, a^{(D)})\| \qquad (8)$$

Graphs 410 and 420 of FIG. 4 depict the measured absorptance functions T(a) and $T_{blend}(a^{(S)}, a^{(D)})$, respectively, according to various embodiments. For example, when the input continuous-tone gray level a for a pixel is given, the absorptance cost is the function of the blending pair $(a^{(S)}, a^{(D)})$ with 625 inputs, and there is at least one blending pair $(a^{(S)}, a^{(D)})$ which has minimum absorptance cost Φ. In this case, according to one embodiment, the blending pair $(a^{(S)}, a^{(D)})$ is the optimal parameter for the given a. For each input tone, one of the 625 blending pair tones is selected, according to one embodiment.

Figure 16:
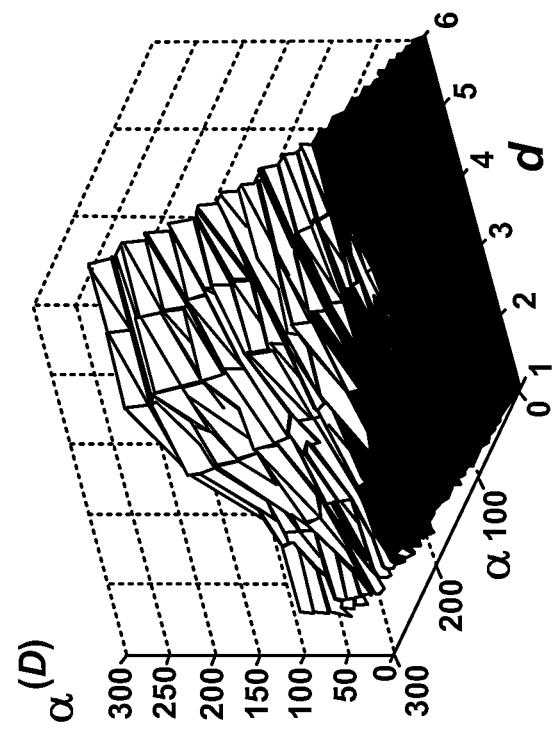
FIG. 16 below depicts (a) smooth region coefficient $a^{(S)}$ for a blending pair ($a^{(S)}$, $a^{(D)}$) and (b) detail region coefficient $a^{(D)}$ for a blending pair ($a^{(S)}$, $a^{(D)}$), according to one embodiment.
Figure 16:
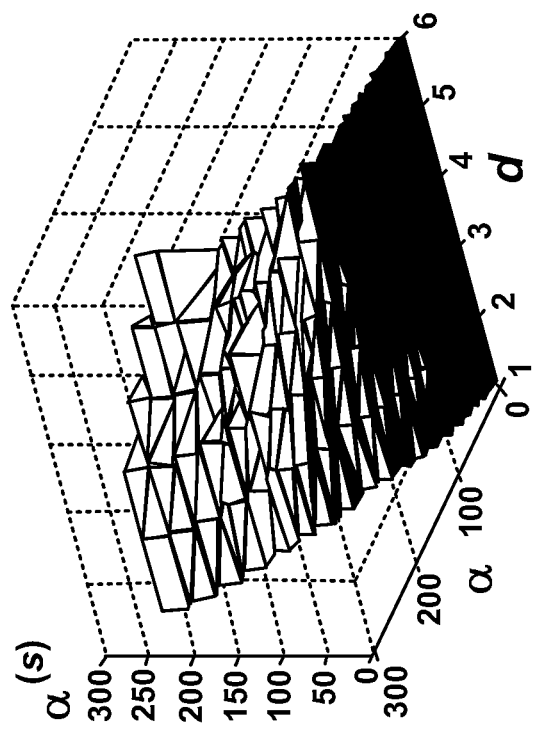

FIG. 16 below depicts (a) smooth region coefficient $a^{(S)}$ for a blending pair $(a^{(S)},a^{(D)})$ and (b) detail region coefficient $a^{(D)}$ for a blending pair $(a^{(S)},a^{(D)})$, according to one embodiment. According to one embodiment, these coefficient values are stored in the halftone blending LUT given by Table 5 for use during the on-line processing.

Second, a ratio function ρ(d) can be also used as a part of calculating the blending pair values $(a^{(S)},a^{(D)})$. It defines the ideal ratio $a^{(D)}/a^{(S)}$ for the blending pair $(a^{(S)},a^{(D)})$. For example, a ratio function ρ(d) (also known as a "ratio curve") can be calculated as depicted in FIG. 11; and the ratio function ρ(d) can be used in the computation of the ratio cost function Ψ between ρ(d) and $a^{(D)}/a^{(S)}$. Conceptually, according to one embodiment, the ratio cost function Ψ is the subtraction $\|\rho(d)-a^{(D)}/a^{(S)}\|$. However, in this case, the ratio cost function Ψ may not reflect the ratio difference correctly because when ρ(d)<1, it is less sensitive to difference and when ρ(d)>1, it is more sensitive to difference. Therefore, according to one embodiment, equation 9 below is used to represent the ratio cost Ψ:

$$\Psi = \Psi(a^{(S)}, a^{(D)} | d) = \left\| \max\left\{ \frac{a^{(D)}/a^{(S)}}{\rho(d)}, \frac{\rho(d)}{a^{(D)}/a^{(S)}} \right\} \right\| \quad (9)$$

The cost ratio Ψ, according to one embodiment, is always greater than or equal to unity; and the best case is Ψ=1, which means $\rho(d)=a^{(D)}/a^{(S)}$.

Therefore, according to one embodiment, in this case the ratio of the blending pair $a^{(D)}/a^{(S)}$ falls exactly on the target ratio curve ρ; and the cost ratio Ψ increases as the difference between the ratio curve ρ(d) and the blending pair ratio $a^{(D)}/a^{(S)}$ increases.

As discussed herein, according to one embodiment, the cost function C is equal to the sum of the absorptance cost Φ and the ratio cost Ψ. Equation 8 can be used to solve for the absorptance cost Φ and equation 9 can be used to solve for the ratio cost Ψ. Further the result $\tilde{\theta}$ of equation 7 provides the optimal blending pair that minimizes the cost function C, according to one embodiment. Therefore, equations 8 and 9 can be used to solve equation 6 resulting in equation 10 below.

$$\tilde{\theta}(a, d) = \arg\min_{\theta} C(\theta | a, d) = \arg\min_{(a^{(S)},a^{(D)})} \quad (10)$$
$$\left( \|T(a) - T_{blend}(a^{(S)}, a^{(D)})\| + \left\| \max\left\{ \frac{a^{(D)}/a^{(S)}}{\rho(d)}, \frac{\rho(d)}{a^{(D)}/a^{(S)}} \right\} \right\| \right)$$

Therefore, equation 10 can be used, according to one embodiment, to find a blending pair $(a^{(S)},a^{(D)})$ that minimizes the cost function C=Φ+Ψ, given (a,d). The results can be stored in a blending lookup table (LUT) as depicted in Table 5, for example. The values in the blending LUT can be used in the seamless halftone process as depicted in FIG. 3, for example, as input to blocks 310 and 312, among other things.

According to one embodiment, halftone patterns are selected for the respective smooth and detail regions. For example, a low LPI halftone pattern can be selected for the smooth region 110 (FIGS. 1 and 2) and high LPI halftone texture can be selected for the detail region 120 (FIGS. 1 and 2). According to one embodiment, arbitrary selection may result in an undesirable moiré effect. The moiré effect can produce some halo artifacts where bright or dark are located at the outline of region 110, 120 (FIGS. 1 and 2).

Figure 5:
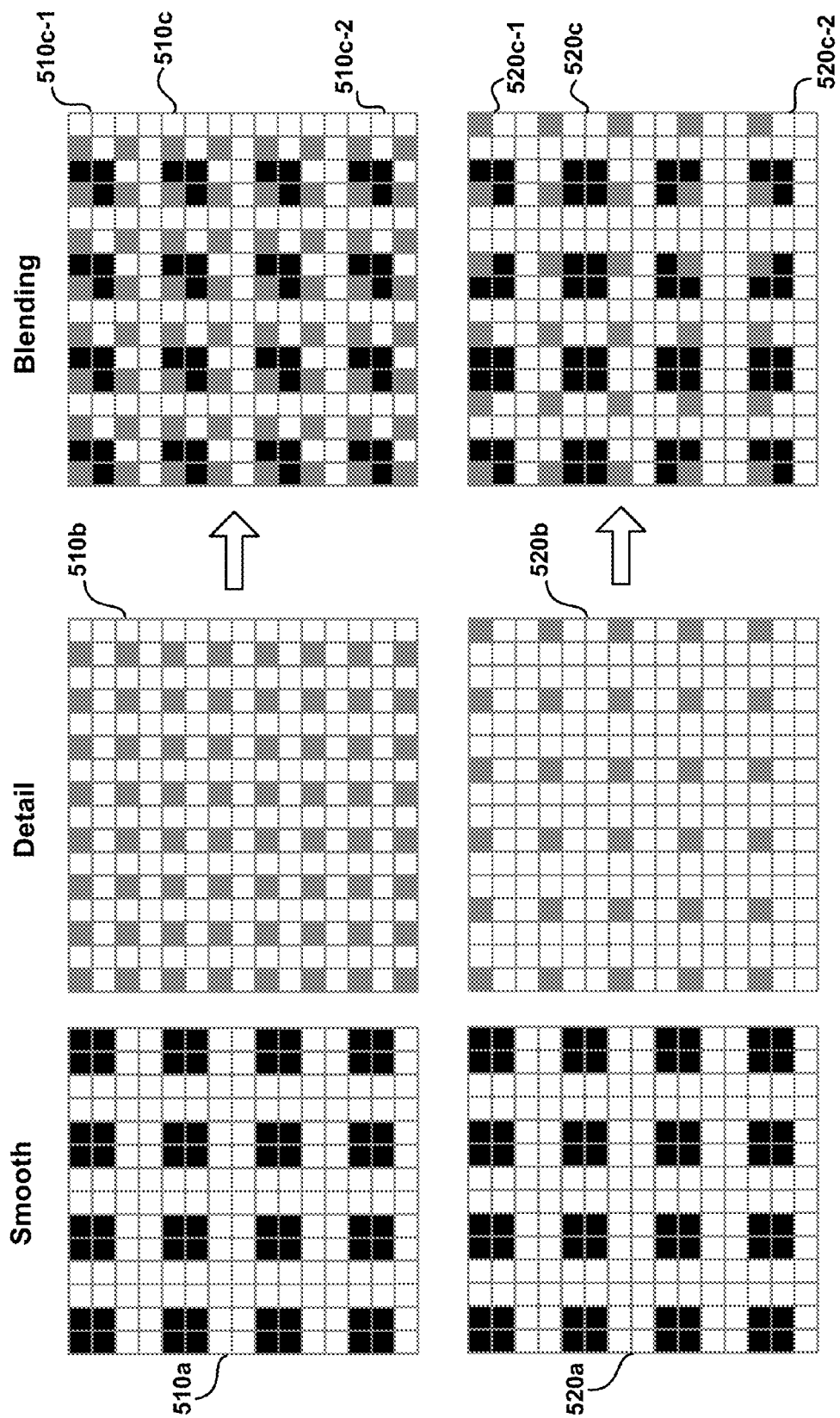
FIG. 5 depicts examples of moiré-free halftone patterns and a moiré producing halftone patterns, according to various embodiments.

FIG. 5 depicts examples of moiré-free halftone patterns 510a, 510b and moiré producing halftone patterns 520a, 510b, according to various embodiments. More specifically, FIG. 5 depicts a smooth halftone pattern 510a and a detail halftone pattern 510b that result in a moiré-free blend 510c. FIG. 5 also depicts a smooth halftone pattern 520a and a detail halftone pattern 520b that results in a moiré blend 520c.

In 520c, the blending of the smooth and detail halftone patterns 520a, 520b is very irregular. For example, the same pattern of the first line 520c-1 is repeated at the last line 520c-2, so the period becomes larger resulting in a very low halftone frequency. However, according to one embodiment, when two halftone patterns are selected harmonically, such as halftone patterns 510a and 510b, the result 510c is a regular blending pattern which is repeated with the same period as that of the smooth halftone pattern 510a, which reduces or eliminates the moiré effect. For example, the first and last lines 510c-1 and 510c-2 of 510c have the same pattern, as do the second and third lines.

The examples 510a, 510b, 510c, 520a, 520b, 520c are merely used to illustrate embodiments and should not be interpreted to limit embodiments. Other examples of halftone patterns are well suited for various embodiments.

Figure 6:
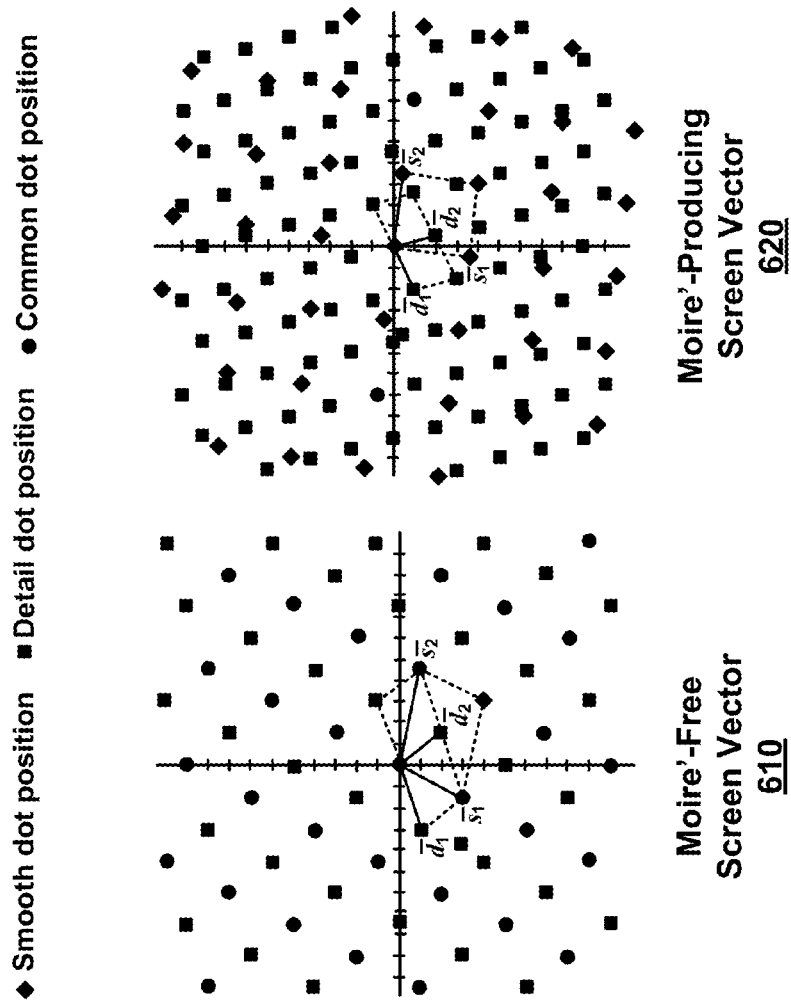
FIG. 6 depicts two vectors where one vector is a moiré-free screen vector, according to various embodiments, and the other vector is a moiré-producing screen vector.

According to one embodiment, two pairs of screen vectors are selected as a part of the screening process. FIG. 6 depicts two pairs of vectors where one pair 610 is a moiré-free screen vector pair, according to various embodiments, and the other pair 620 is a moiré-producing screen vector pair. Both vector pairs 610, 620 depict dot positions that are smooth, detail, and common. Diamonds represent smooth dot positions, squares represent detail dot positions and circles represent dot positions that are common to the smooth region and the detail region, referred to herein as "common dot positions."

The following equation (11) can be used to describe FIG. 6, according to one embodiment.

Smooth screen:$S=[\vec{s}_1, \vec{s}_2]$, detail screen:$D=[\vec{d}_1, \vec{d}_2]$ Bleding condition:$\exists \alpha_1,\alpha_2,\beta_1,\beta_2 \in Z$ such that $\vec{s}_1=\alpha_1 \vec{d}_1+\beta_1 \vec{d}_2$ and $\vec{s}_2=\alpha_2 \vec{d}_1+\beta_2 \vec{d}_2$ (11)

where Z means integer set. Equation (11) indicates that the span of the sum of all integer multiples of the two vectors of a detail halftone must meet the vertices of the smooth halftone, according to one embodiment. The moiré-free screen vector pair 610 results from using equation 11, according to one embodiment. For example, in 610 all of the smooth halftone positions are perfectly matched with the detail halftone positions. However, in the moiré-producing screen vector pair 620, the dot patterns are so irregular that there are only a few common dot positions. This results in a very low blending frequency, which causes moiré artifacts.

Figure 7:
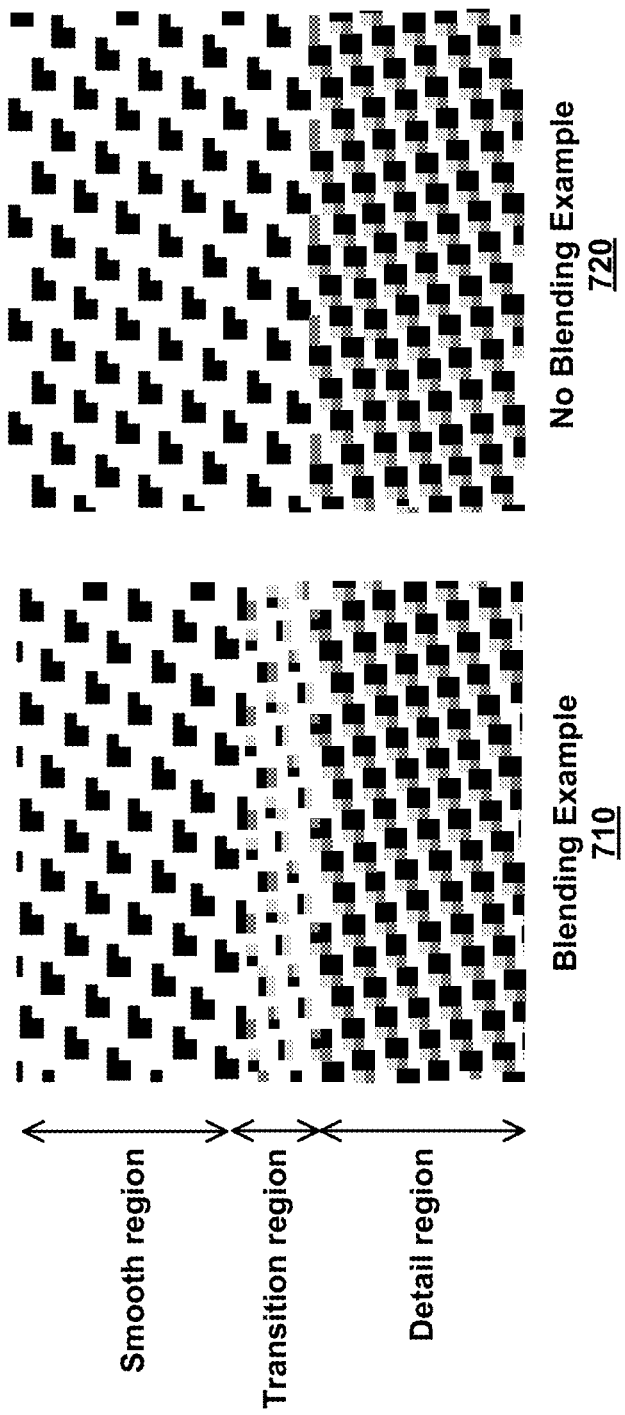
FIG. 7 depicts two examples where one example illustrates blending between a smooth region and a detail region in a transition region, according to various embodiments, and the other example depicts no blending between a smooth region and a detail region.

FIG. 7 depicts two examples 710, 720 where one 710 illustrates blending between a smooth region 110 and a detail region 120 in a transition region 210, according to various embodiments, and the other example 720 depicts no blending between a smooth region 110 and a detail region 120.

As depicted in FIG. 7, the examples 710, 720 are digital halftoned images. The smooth and detail halftone patterns for 710 were selected using the conditions specified by equation 11, according to one embodiment. The dots for the blending example 710 are chosen by halftone texture blending method described in the context of FIG. 3. As can be seen, the results depicted at 710, where halftone patterns were selected using various embodiments and blending was performed according to various embodiments, provide better quality that the results depicted at no blending example 720.

According to one embodiment, screen vectors are composed of two factors: lines per inch (LPI) and angle. LPI can be used as the magnitude of the vector, and angle can be used as the direction of the vector. In so doing, dot growth can follow the vector angle direction. After several observations, it was determined that one of main reasons for boundary artifacts is the angle between a boundary and a screen vector. As the angle between the boundary and the screen vector goes to orthogonal (90°), raggedness is hardly noticeable. However, as the angle between the boundary and the screen vector goes to parallel (0°), raggedness becomes severe. To overcome this problem, according to one embodiment, the blending strength is controlled so that the blending strength becomes stronger as angle 0° is approached and the blending strength becomes weaker as the process moves away from angle 0°.

The vector angle can already be determined, according to one embodiment. Therefore, the boundary angle and the angle difference can be computed. A Sobel operator as discussed in the context of equations 1-3, which results in a Sobel size of 3×3, can be used for approximating the location of the boundary. However, a larger Sobel size may be used to determine more detail angle values, as depicted in Table 8 below:

TABLE 8

Sobel Operator $$S_v = \begin{bmatrix} -1 & -2 & 0 & 2 & 1 \\ -2 & -3 & 0 & 3 & 2 \\ -3 & -5 & 0 & 5 & 3 \\ -2 & -3 & 0 & 3 & 2 \\ -1 & -2 & 0 & 2 & 1 \end{bmatrix}, S_h = \begin{bmatrix} -1 & -2 & -3 & -2 & -1 \\ -2 & -3 & -5 & -3 & -2 \\ 0 & 0 & 0 & 0 & 0 \\ 2 & 3 & 5 & 3 & 2 \\ 1 & 2 & 3 & 2 & 1 \end{bmatrix}$$

In this case, a 5×5 neighborhood window denoted C(x,y) can be used to compute gradients $G_v$ and $G_h$ using equation 13 below, according to one embodiment:

$$G_v(x,y) = S_v \otimes C(x,y), G_h(x,y) = S_h \otimes C(x,y) \quad (13)$$

Finally, using the arctan function, the angle of a boundary pixel can be estimated using equation 14, according to one embodiment.

$$\alpha(x, y) = \arctan\left(\frac{G_v(x, y)}{G_h(x, y)}\right)\frac{180}{\pi} \quad (14)$$

where α(x,y) represents the boundary angle. At this point the vector angle and boundary angle have been determined, so the difference between the vector angle and the boundary angle can be computed. Next, according to one embodiment, a blending strength that is in proportion to the angle difference is determined. For example, assume that β represents the screen vector angle and δ represents the angle difference. In this case, the angle difference δ is equal to the absolute value of the difference between the boundary angle α and the screen vector angle β as represented by the equation δ=|α−β|, according to one embodiment. According to one embodiment, a weighting factor ω is determined. Because the maximum angle difference is 90, the weighting factor ω can be expressed as:

$$\omega = \frac{90 - \delta}{90} \quad (15)$$

The blending strength can be controlled, according to one embodiment, by modifying the distance d between the current pixel location (x,y) and the transition region start 220a (FIG. 2). The ratio function ρ can be altered into $\hat{\rho}$ as follows, according to one embodiment:

$$\hat{\rho}(d) = \begin{cases} \rho(d \times \omega), & d < d_{max}/2 \text{ (smooth region)} \\ \rho(d_{max} - (d_{max} - d) \times \omega), & d \geq d_{max}/2 \text{ (detail region)} \end{cases} \quad (16)$$

where total transition width 230 (FIG. 2) is represented as $d_{max}$ and the current distance value is represented as d.

Figure 17:
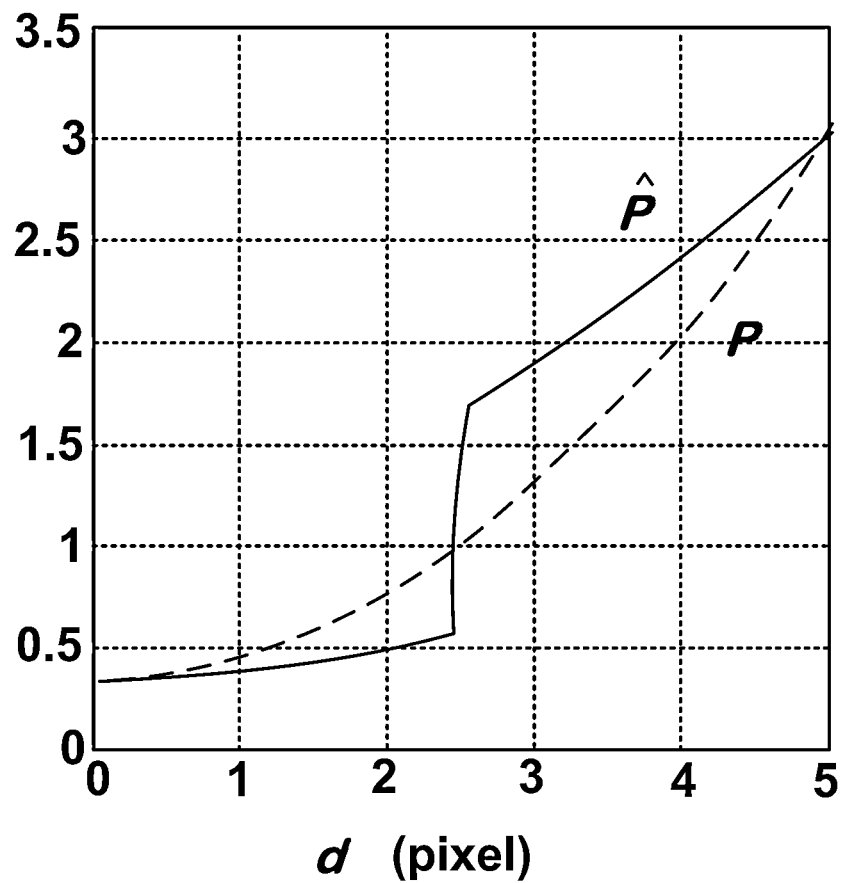
FIG. 17 depicts a graph of an altered ratio function $\hat{\rho}$ using a weighting factor $\omega$ that has a value $\omega=0.6$, according to one embodiment.

FIG. 17 depicts a graph of an altered ratio function $\hat{\rho}$ using a weighting factor ω that has a value ω=0.6, according to one embodiment. In this illustration, a weaker blending pattern is applied to emphasize the smoother halftone pattern in the smooth region 110 and to emphasize the more detailed halftone pattern in the detail region 120 (FIGS. 1 and 2). This can be accomplished, according to various embodiments, by reducing the ratio function in the smooth region 110 and increasing the ratio function in the detail region 120 as depicted in FIG. 17.

Figure 18:
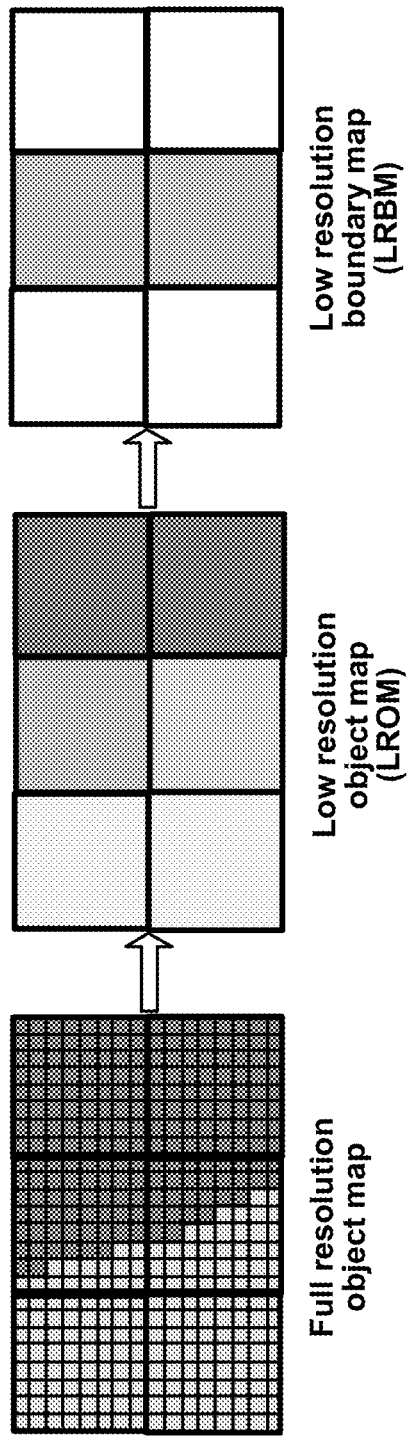
FIG. 18 depicts a low resolution image construction approach, according to one embodiment.

Typically, printers are embedded system with limited memory resource and processing capability. Therefore, they print out documents line-by-line, and they have a small amount of memory to do additional processing. According to one embodiment, a method that takes these constraints into account is provided. For example, if a larger size is used for the transition region 210 (FIG. 2), a larger amount of memory and processing will be used, which increases the cost of the printer. Therefore, according to one embodiment, a low resolution (LR) approach is used to reduce the amount of memory used for blending. FIG. 18 depicts a low resolution image construction approach, according to one embodiment. In the following illustration, assume that a 75 dpi LR object map (LROM) is used to create the transition region 210 (FIG. 2) instead of a 600 dpi full resolution object map. In this case, 1 pixel in the LROM is obtained from the average value of 8×8 full resolution pixels, and therefore, the LROM may lose the original boundary position. However, the original boundary 210a (FIG. 2) can be approximated based on the LROM pixel values. According to one embodiment, the low resolution boundary map (LRBM) is an input to the process. LRBM can be obtained using the Sobel operator computation from the LROM, as discussed herein.

More specifically, to estimate the boundary 210a (FIG. 2), assume that the window of the LROM is set to 5×5. LROM values represent the average of 8×8 pixels of the full resolution image, according to one embodiment. Therefore, by using average values, the real boundary pixels can be approximated, according to one embodiment. To estimate boundary pixels, 3 kinds of blocks in LROM can be used. These 3 kinds of blocks include processing block, boundary block, and reference block, according to one embodiment. P shall represent processing blocks, B shall represent boundary blocks and R shall represent reference blocks.

Figure 13:
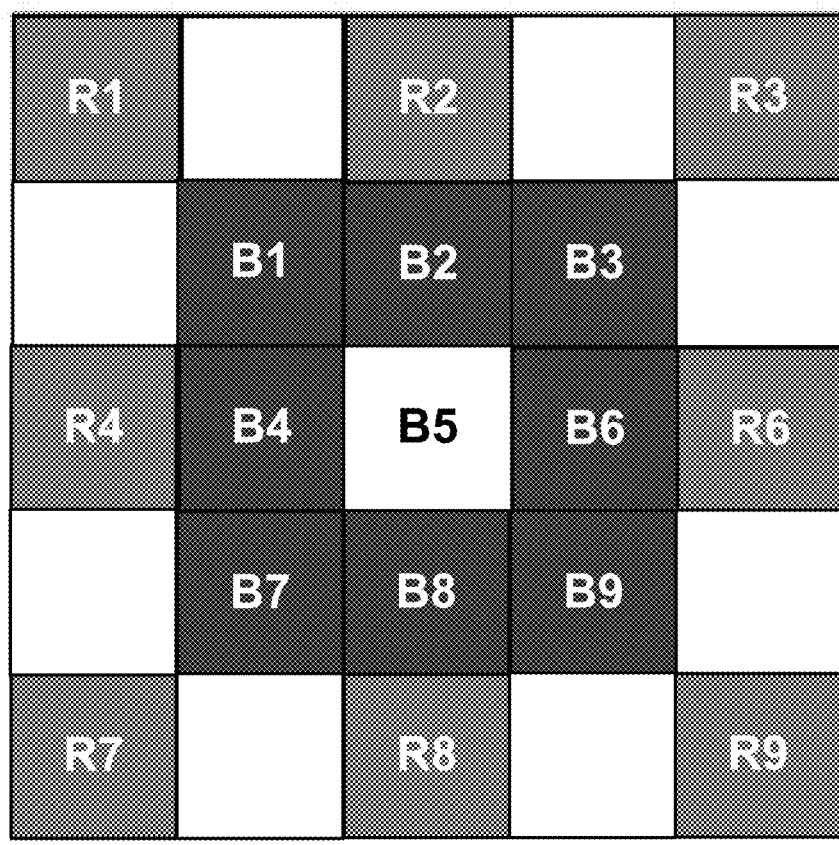
FIG. 13 depicts a boundary and reference block, according to one embodiment.

A processing block is the block which includes current full-resolution processing pixel (x,y) (FIG. 2). FIG. 13 depicts a boundary and reference block, according to one embodiment. In the FIG. 13, B5 is a processing block. A boundary block is the block determined by the LRBM. The dark gray blocks in FIG. 13 are the boundary blocks. In this illustration, since we search for the boundary in a 3×3 neighborhood, boundary blocks will be among B1~B9. If the boundary 210*a* (FIG. 2) is not in the 3×3 neighborhood, blending is not performed according to various embodiments and processing moves to the next pixel. A reference block is dependent on the boundary block position. FIG. 13 shows the boundary and reference block pair. For instance, assuming that the boundary block is B6, the corresponding reference block will be R6, and assuming that the boundary block is B7, then the corresponding reference block is R7.

Figure 14:
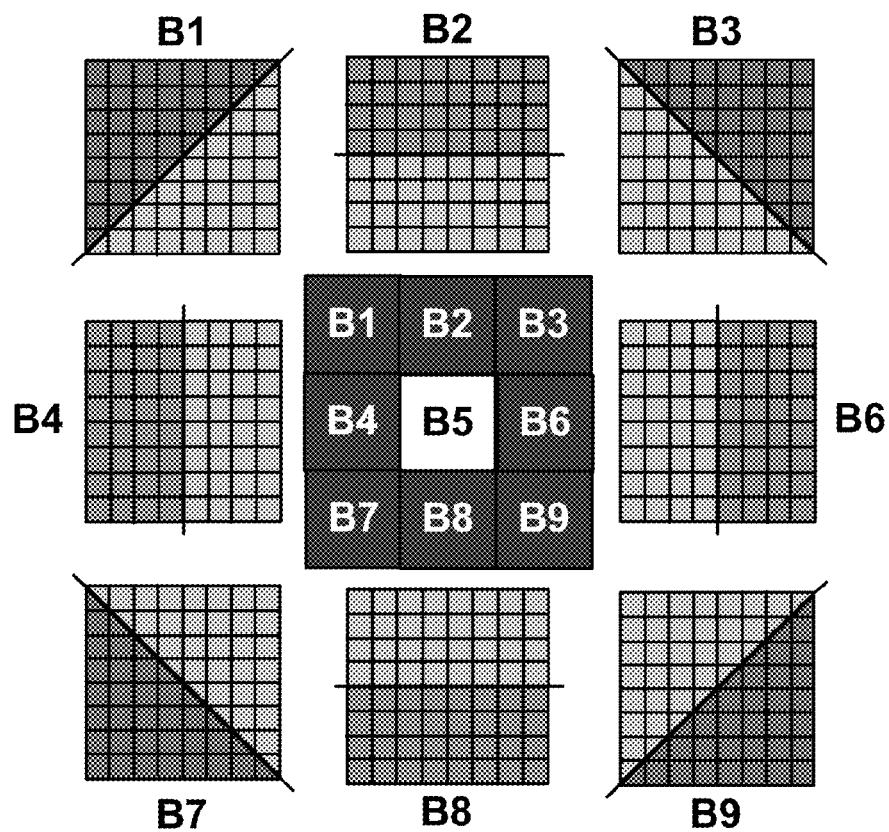
FIG. 14 depicts the boundary direction determined by boundary blocks, according to one embodiment.

According to one embodiment, two factors are approximated from LR images 100 (FIG. 1): boundary direction and boundary position. Boundary direction can be determined by the boundary blocks. FIG. 14 depicts the boundary direction determined by boundary blocks, according to one embodiment. According to one embodiment, the boundary 210*a* (FIG. 2) is horizontal when boundary blocks are B2 or B8, vertical when the boundary blocks are B4 or B6, and diagonal when the boundary blocks are B1, B3, B7, or B9.

The position of the boundary 210*a* (FIG. 2) can be approximated based on the boundary direction, according to one embodiment. According to one embodiment, the process uses the three types of blocks (boundary, processing, and reference). P represents the processing block value, B represents the boundary block value, and R represents the reference block value. Once a boundary block is specified, a processing block and a reference block can be selected. If the boundary pixel exists in the boundary block, according to one embodiment, it can be assumed that the processing block and reference block are different types of objects in the LROM. Therefore, a processing block value must be different from a reference block value, according to one embodiment. Further, according to one embodiment, it will usually be assumed that the boundary block has an intermediate value between P and R, i.e. P≤B≤R or R≤B≤P.

Figure 15:
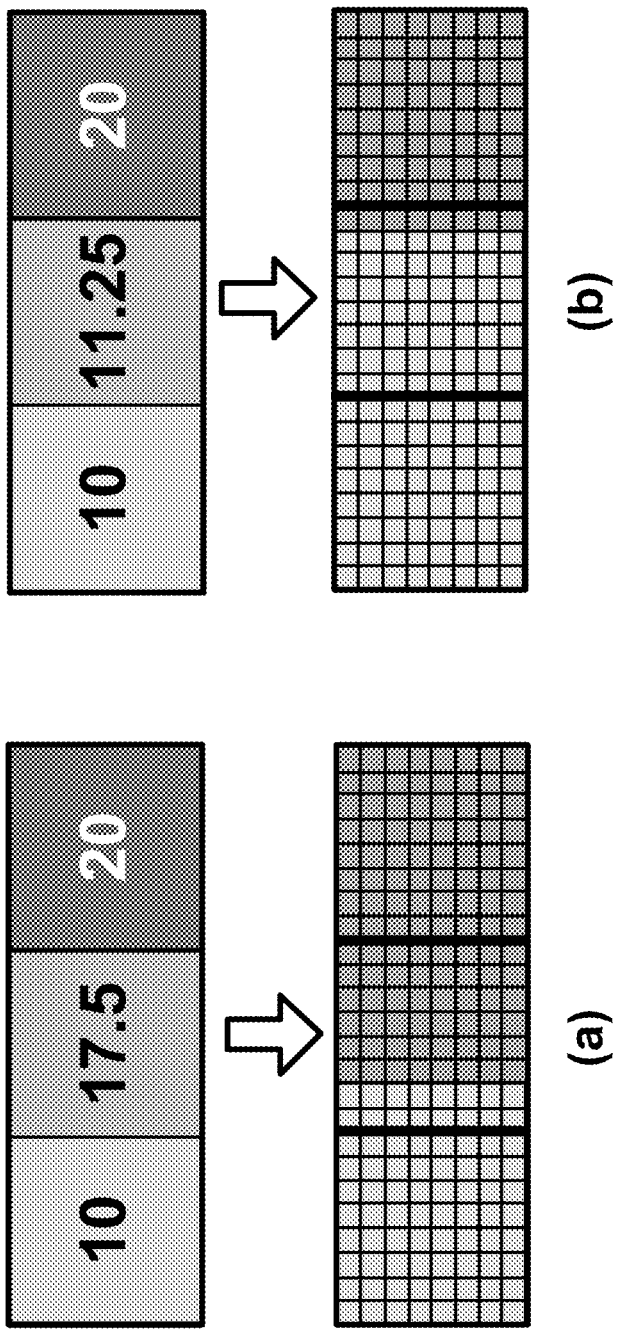
FIG. 15 depicts boundary position estimation, according to one embodiment.

According to another embodiment, the ratio r is used to determine a different value for a boundary block where r can be defined using equation 17 below $$r = \left| \frac{R-B}{R-P} \right| \quad (17)$$

because P≤B≤R or R≤B≤P and r has a range 0≤r≤1. If r is close to 0, dominant pixel values of the original boundary block belong to a reference block R, according to one embodiment. Consequently dominant pixel values of an original boundary block belong to a reference block R and, therefore, the boundary 210*a*'s position is close to the processing block. In contrast, if r is getting close to 1, then the boundary 210*a*'s position is getting close to the reference block, according to one embodiment. FIG. 15 depicts boundary position estimation, according to one embodiment. For example, as depicted in FIG. 15 (*a*), P=10, B=17.5, and R=20, then the corresponding r value is r=0.25. In this case, the process can determine that the boundary 210*a* (FIG. 2) will be located at the 2nd column using approximation, according to one embodiment. As depicted at (b) in FIG. 15 below, the corresponding r value is r=0.875, which in this case will locate the approximated position of the boundary at the 7th column, according to one embodiment.

According to one embodiment, the low resolution (LR) approach enables a relatively large transition window size to be used, which provides a smoother and more natural transition pattern. However, at small size text, the performance of the low resolution (LR) approach may suffer because many curves may be used to approximate boundary positions of small text. Therefore, according to various embodiments, different transition region sizes are used depending on whether full resolution is used or low resolution is used.

Examples of different transition region sizes are as follows

1) Small transition region and full resolution approach: transition region size is 6 pixels,
2) Large transition region and low resolution approach: transition region size is 16 pixels with a 5×5 pixel low resolution window.

With respect to option 2), 8 pixels can be used in both the smooth region 110 and the detail region 120 of the transition region 210, according to one embodiment. In this case, the 8 pixels for the smooth region 110 plus the 8 pixels for the detail region provides for a 16 pixel wide transition region 210. Since 1 pixel for low resolution translates into 8×8 pixels for full resolution, a 3×3 boundary block may be used. In this case, a 5×5 boundary-reference window may be used.

Various embodiments have been discussed in the context of halftone texture blending. According to another embodiment, halftone quantization blending can be used. With halftone quantization blending, the halftone texture patterns 510*a*, 510*b* are selected as discussed, for example, in the context of FIG. 5. Then the two halftone texture patterns 510*a*, 510*b* can be blended using a control parameter λ. λ is also dependent on the distance d within the transition region 210 (FIG. 2), according to one embodiment. At each point within the transition region 210 (FIG. 2), the control parameter λ is set to a value and the two halftone patterns 510*a*, 510*b* (FIG. 5) are blended according to the value of λ. This quantization is then used to create the final output pixel value g(x,y). Equation 18 below can be used to express halftone quantization blending, according to one embodiment:

$$g(x,y) = \Psi\{\lambda h^{(D)}(x,y) + (1-\lambda)h^{(S)}(x,y)\} \quad (18)$$

where $h^{(D)}$ and $h^{(S)}$ are outputs of the detail and smooth screening process determined by equation (5) with smooth and detail screens $t_i^{(S)}(x,y), i=0, 1, \ldots, n-2$ and $t_i^{(D)}(x,y), i=0, 1, \ldots, n=2$, respectively. One difference is that we use modified input gray level $a^{(S)}$ and $a^{(D)}$ for halftone texture blending, but we use the original input gray level a for halftone quantization blending, so we do not need the blending LUT in this case.

Assuming that Ω represents the quantization operator to make n-level halftoned output, where n varies from 1 to 255, equation 20 can be used to deterpine the quantization operator Ω as follows:

$$\Omega(m) = \begin{cases} 0, & 0 \le m \le \frac{1}{n} \\ \left[255 \frac{i}{n-1}\right]_R, & \frac{1}{n} \le m \le \frac{i+1}{n}, i=1, 2, \ldots n-2 \\ 1, & m > \frac{n-1}{n} \end{cases} \quad (20)$$

According to one embodiment, for halftone quantization blending, λ is a control parameter that plays the same role as the blending ratio ρ (FIG. 11) between detail and smooth halftone patterns 510*a*, 510*b* (FIG. 5) for halftone texture blending that was discussed previously. Assuming that the range of λ is 0≤λ≤1, then λ=1 indicates that only detail screening should be used, and λ=0 indicates that only smooth screening should be used, according to one embodiment.

According to one embodiment, the parameter λ can be made to vary as a function of the distance parameter d in a manner that is similar to that used for the halftone texture blending method.

Figure 8:
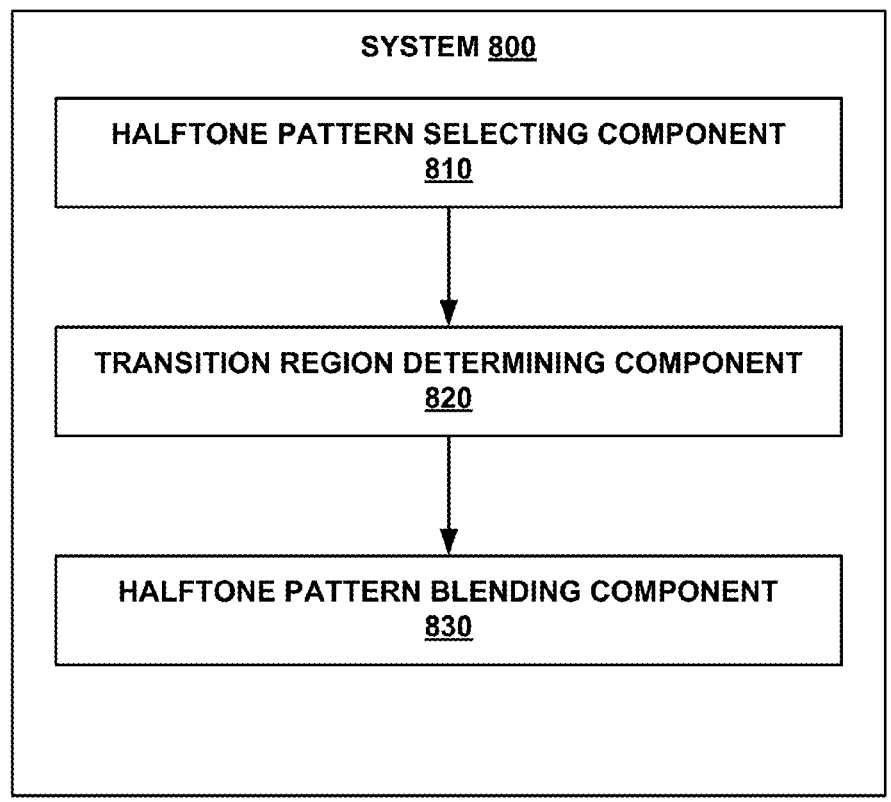
FIG. 8 depicts a system for creating an image to be printed, according to one embodiment.

FIG. 8 depicts a system for creating an image to be printed, according to one embodiment. The blocks that represent features in FIG. 8 can be arranged differently than as illustrated, and can implement additional or fewer features than what are described herein. Further, the features represented by the blocks in FIG. 8 can be combined in various ways. The system 800 can be implemented using hardware, hardware and software, hardware and firmware, or a combination thereof.

As depicted in FIG. 8, the system 800 includes a halftone pattern selecting component 810, a transition region detecting component 820, and a halftone pattern blending component 830.

The halftone pattern selecting component 810 (FIG. 8) is configured for selecting a first halftone pattern 510a, 510b (FIG. 5) for a first periodic clustered dot halftone region 110, 120 (FIGS. 1 and 2) of the image 100 (FIG. 1) to be printed where the first periodic clustered dot halftone region 510a, 510b (FIG. 5) has a first frequency. The halftone pattern selecting component 810 (FIG. 8) is further configured for selecting a second halftone pattern 510a, 510b (FIG. 5) for a second periodic clustered dot halftone region 110, 120 (FIGS. 1 and 2) of the image 100 (FIG. 1) to be printed where the second periodic clustered dot halftone region 110, 120 (FIGS. 1 and 2) has a second frequency. The frequency of one 510b (FIG. 5) of the halftone patterns 510a, 510b (FIG. 5) is higher than the frequency of the other halftone pattern 510a, 510b (FIG. 5).

The transition region determining component 820 (FIG. 8) is configured for determining a transition region 210 (FIG. 2) that includes a boundary 210a (FIG. 2) between the two regions 110, 120 (FIGS. 1 and 2) and includes additional portions 210b, 210c (FIG. 2) of the two regions 110, 120 (FIGS. 1 and 2) beyond the boundary 210a (FIG. 2). The additional portions 210b, 210c (FIG. 2) are respective subsets of each of the two regions 110, 120 (FIG. 2); and a fixed width 230 (FIG. 2) is used for the entire transition region 210 (FIG. 2).

The halftone pattern blending component 830 (FIG. 8) is configured for blending the two halftone patterns 510a, 510b (FIG. 5) in the transition region 210 (FIG. 2) based on a blending ratio ρ (FIG. 11) of the two halftones 510a, 510b (FIG. 5) that changes as a function of distance d (FIG. 2) between the edges 220a, 220b (FIG. 2) of the transition region 210 (FIG. 2).

Figure 9:
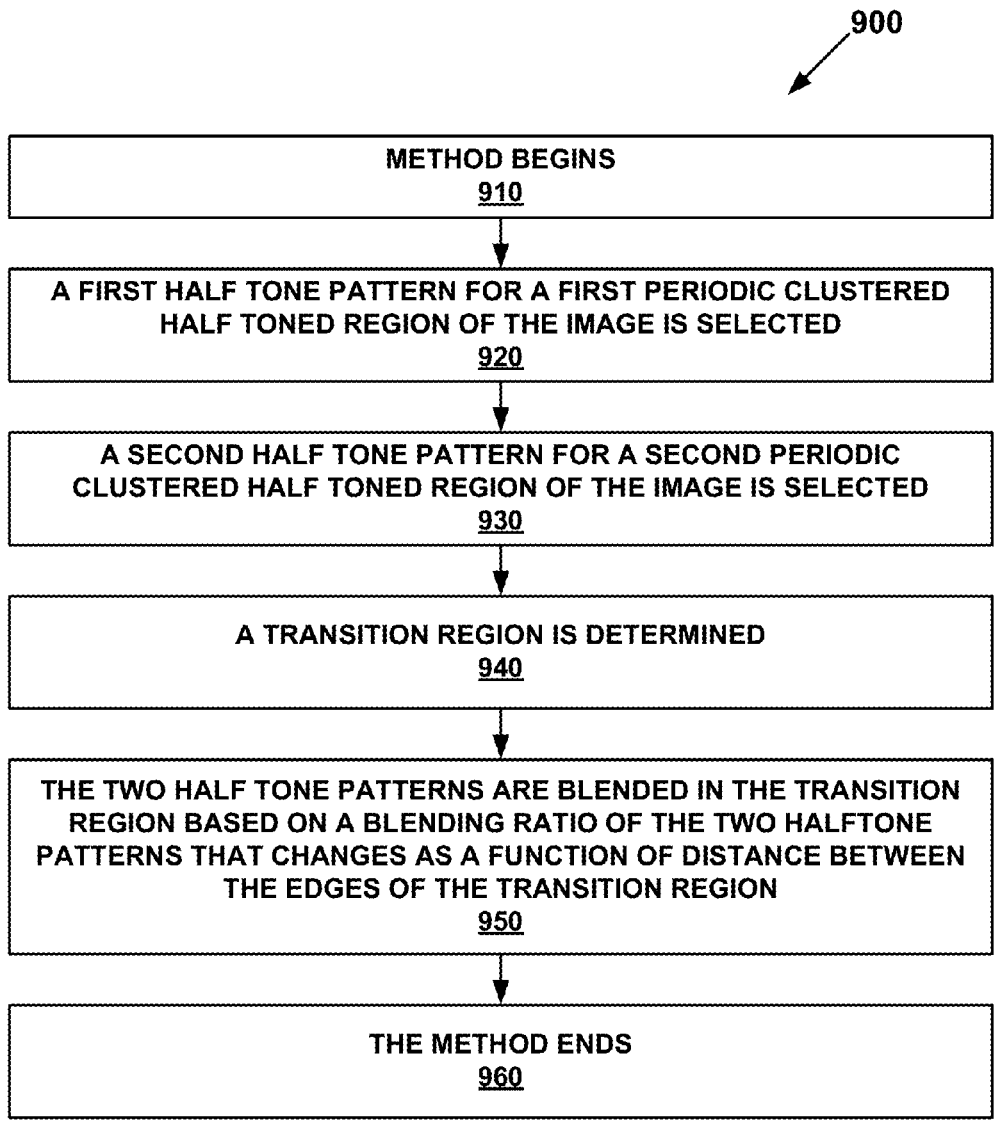
FIG. 9 depicts a method for creating an image to be printed, according to one embodiment.

FIG. 9 depicts a method for creating an image to be printed, according to one embodiment.

Although specific operations are disclosed in flowchart 900, such operations are exemplary. That is, embodiments of the present invention are well suited to performing various other operations or variations of the operations recited in flowchart 900. It is appreciated that the operations in flowchart 900 may be performed in an order different than presented, and that not all of the operations in flowchart 900 may be performed.

The above illustration is only provided by way of example and not by way of limitation. There are other ways of performing the method described by flowchart 900.

At 910, the method begins.

At 920, a first halftone pattern 510a (FIG. 5) for a first periodic clustered dot halftone region 110 (FIGS. 1 and 2) of the image 100 (FIG. 1) is selected. Although either the smooth halftone pattern 510a or the detailed halftone pattern 510b can be selected first, for the sake of illustration, assume that the smooth halftone pattern 510a is selected first. The first periodic clustered dot halftone region 510a has a first frequency, as described herein.

At 930, a second halftone pattern 510b (FIG. 5) for a second periodic clustered dot halftone region 120 (FIGS. 1 and 2) of the image 100 (FIG. 1) is selected. The second periodic clustered dot halftone region 510b (FIG. 5) has a second frequency, as described herein. One of the halftone patterns 510b has a higher frequency than the other halftone pattern 510a. The regions 110, 120 (FIGS. 1 and 2) can be either periodic clustered dot halftoned regions or periodic line screen regions. The halftone patterns 510a, 510b (FIG. 5) can be selected harmonically as depicted FIG. 5 so that, for example, the first and last lines 510c-1, 510c-2 of the pattern 510c that results from blending the halftone patterns 510a, 510b will be the same.

At 940, a transition region 210 (FIG. 2) is determined. The transition region 210 includes a boundary 210a between the two regions 110, 120. For example, at each position along the boundary 210a, according to one embodiment, the boundary 210a includes one pixel from the smooth region 110, and one pixel from the detail region 120. The transition region 210a (FIG. 2) also includes additional portions 210b, 210c (FIG. 2) of the two regions 110, 120 (FIGS. 1 and 2) beyond the boundary 210a (FIG. 2). The additional portions 210b, 210c are respective subsets of each of the two regions 110, 120. For example, assuming that the width 230 of the transition region 210 is 16 pixels, two pixels are subtracted from the 16 for the boundary 210a. Then the remaining 14 is divided by 2 so that the portion 210b, which is a subset of the smooth region 110, is 7 pixels wide, and portion 210c, which is a subset of the detail region 120 is 7 pixels wide.

A fixed width 230 (FIG. 2) is used for the entire transition region 210. The width 230, according to one embodiment, can range between 6 pixels and 16 pixels. The transition region 210 (FIG. 2) is symmetrical, according to one embodiment, because the portions 210b, 210c (FIG. 2) have the same width. Although various embodiments are described in the context of two portions 210b, 210c that have equal widths, embodiments are well suited to a single portion or portions that have different widths.

For the sake of illustration, assume that the width 230 (FIG. 2) of the transition region 210 (FIG. 2) is 6 pixels. Two pixels, one from each region 110, 120, are associated with the boundary 210a, according to one embodiment. The remaining 4 pixels can be divided evenly between the portions 210b and 210c of the transition region 210 at each side of the boundary 210a. For the sake of illustration, assume that the 6 pixels for the transition region's width 230, are numbered 1-6 starting at transition start 220a. In this case, pixels 1-3 are associated with the smooth region 110 and pixels 4-6 are associated with the detail region 120. Further, in this case, pixels numbered 3 and 4 are associated with the boundary 210a.

The location of the boundary 210a (FIG. 2) can be approximated, for example, using a Sobel operator as depicted in Table 1 and equation 3, as discussed herein. The distance d is computed, for example, using an object map o(x,y), which is derived from information obtained from page description language associated with the image 100 (FIG. 1), a distance LUT as depicted in Table 3, and a distance $d_b$, as discussed herein.

At 950, the two half tone patterns are blended with each other in the transition region based on a blending ratio of the two halftone patterns that changes as a function of distance between the edges of the transition region. For example, according to one embodiment, halftone texture blending is used.

According to one embodiment, the two halftone patterns 510a, 510b (FIG. 5) are blended in the transition region 210 (FIG. 2) based on a blending ratio ρ (FIG. 11) of the two halftone patterns 510a, 510b (FIG. 5) that changes as a function of distance d (FIG. 2) between the edges 220a, 220b of the transition region 210.

For example, referring to FIG. 2, when the distance d is 0, the current processing pixel x,y is at the transition start 220a. As the blending process proceeds across the transition region 220a, pixel by pixel, the distance d between the current processing pixel x,y and the transition start 220a (FIG. 2) increases. When the distance d is $d_{max}$, the current processing pixel x,y is at the transition end 220b.

Referring to FIGS. 2 and 5, according to one embodiment, when the blending process begins with the current processing pixel x,y at the transition start 220a, only the halftone pattern 510a selected for the smooth region 110 (referred to herein as the smooth region 110's halftone pattern) is used. As the processing proceeding, pixel by pixel, across the transition region 210, progressively less of the smooth region's halftone pattern 510a is used and progressively more of the halftone pattern 510b selected for the detail region 120 (referred to herein as the detail region 120's halftone pattern) is used. When the processing is at the center of the transition region 210, equal amounts of the respective two halftone patterns 510a, 510b are used, according to one embodiment. After the processing passes the center toward the transition end 220b, the amount of the detail region 120's halftone pattern 510b exceeds the amount of the smooth region 110's halftone pattern 510a.

As processing proceeds from the center towards the transition end 220b of the transition region 210, the amount of the detail region 120's halftone pattern 510b continues to progressively increase and the amount of the smooth region 110's halftone pattern 510a continues to progressively decrease until only the detail region 120's halftone pattern 510b is used when the processing arrives at the transition end 220b. According to one embodiment, a blending ratio that is a function of distance d, such as the blending ratio ρ (FIG. 11), is used as a part of determining the respective amounts of the respective halftone patterns 510a, 510b to use at each pixel processed in the transition region 210.

According to one embodiment, a blending pair $a^{(S)}, a^{(D)}$ is used as a part of the blending. According to one embodiment, $a^{(S)}$ represents a modified continuous-tone value associated with the smooth halftone pattern $h^{(S)}(x,y)$, also known as 510a, and $a^{(D)}$ represents a modified continuous-tone value associated with the detail halftone pattern $h^{(D)}(x,y)$, also known as 510b. According to one embodiment, a blending pair $a^{(S)}, a^{(D)}$ is used as a part of the blending where the blending pair $a^{(S)}, a^{(D)}$ is selected so that it minimizes a cost function C that is based on an tone reproduction error cost Φ and a ratio error cost Ψ. The minimized cost function C can be represented by $\bar{\theta}$, which can be computed using Equation 7. According to one embodiment, the blending pairs $a^{(S)}, a^{(D)}$ can be obtained from a pre-computed blending lookup table (LUT) as depicted in Table 5.

According to one embodiment, at each pixel x,y (FIG. 2) in the transition region 210 (FIG. 2), an output pixel g(x,y) is computed by taking the maximum of the smooth halftone pattern $h^{(S)}(x,y)$ and the detail halftone pattern $h^{(D)}(x,y)$ using a blending pair $(a^{(S)}, a^{(D)})$ that minimizes a cost function C, which is the sum of the tone reproduction error cost Φ and ratio error cost Ψ according to equation 7. The output pixel value g(x,y) can be saved in memory, such as a page buffer.

The smooth halftone pattern $h^{(S)}(x,y)$ and the detail halftone pattern $h^{(D)}(x,y)$ are also referred to respectively as 510a, 510b (FIG. 5).

According to one embodiment, the angle is used as a part of Controlling the strength of the blending ratio ρ (FIG. 11). For example, experiments have shown that as the angle between the boundary 210a (FIG. 2) and the screen vector 610 (FIG. 6) goes to orthogonal (90°), raggedness is hardly noticeable. However, as the angle between the boundary 210a (FIG. 2) and the screen vector 610 (FIG. 6) goes to parallel (0°), the raggedness becomes severe. To overcome this problem, the strength of the blending (referred to herein as "blending strength") is controlled so that the blending strength becomes progressively stronger as angle 0° is approached and the blending strength becomes progressively weaker as the process moves away from angle 0°, according to one embodiment. As a part of controlling the strength of the blending ratio, an altered blending ratio $\hat{\rho}$ (FIG. 17) can be determined.

FIG. 3 depicts a flow chart 300 for a halftone texture blending method, according to various embodiments.

According to another embodiment, halftone quantization blending is used, as described in the context of equations 18-20.

According to one embodiment, a low resolution approach is used as a part of blending, as discussed in the context of Tables 8-11 and equation 17.

At 960, the method ends.

According to one embodiment, 920-950 are performed by one or more computer processors. According to one embodiment, the computer processors are associated with a computer printer. According to one embodiment, the computer printer is a laser electrophotographic printer.

Any one or more of the embodiments described herein can be implemented using non-transitory computer readable storage medium and computer-executable instructions which reside, for example, in the computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., a software program) that reside within non-transitory computer readable storage memory of a computer system and are executed by the computer processor of the computer system. When executed, the instructions cause the computer system to implement the functionality of various embodiments of the present invention.

According to various embodiments, a system 800 and a method 900 provide for blending in a transition region without requiring more than two screens and without requiring more than two halftone patterns.

According to various embodiments, a system 800 and a method 900 do not require any of the following: (1) local contrast calculations, for example, at every pixel in an image, such as a grey scale image, (2) calculating blending coefficients solely based on local contrast results, (3) error diffusion techniques that compute an error between a continuous image and a halftoned image, (4) distributing calculated error values within a neighborhood, (5) computing error diffusion, which results in high computational complexity, computing an activity index using gray scale image information, (6) computing an activity index that is a gray value measurement of how much spatial variation there is in the neighbor of a given pixel, (7) computing gray scale image data, and (8) relying solely on pixels in the boundary.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method for creating an image to be printed, comprising:
   selecting a first halftone pattern for a first periodic clustered dot halftone region of the image to be printed wherein the first periodic clustered dot halftone region has a first frequency;
   selecting a second halftone pattern for a second periodic clustered dot halftone region of the image to be printed wherein the second periodic clustered dot halftone region has a second frequency and wherein one of the frequencies is higher than the other frequency;
   determining a transition region that includes a boundary between the two halftone regions and includes additional portions of the two halftone regions beyond the boundary, wherein the additional portions are respective subsets of each of the two halftone regions and wherein a fixed width is used for the entire transition region; and
   blending the two halftone patterns with each other in the transition region based on a blending ratio of the two halftone patterns that changes as a function of distance between the edges of the transition region, wherein the selecting of the first and second halftone patterns, the determining and the blending are performed by one or more computer processors and wherein the blending of the two halftone patterns further comprises:
      controlling a strength of the blending ratio based on an angle between the boundary and a screen vector associated with a respective region.

2. The method as recited by claim 1, wherein the determining of the transition region further comprises:
   approximating the location of the boundary using an object map that is derived from information obtained from page description language associated with the image; and
   applying a Sobel operator to the object map.

3. The method as recited by claim 1, wherein the blending of the two halftone patterns further comprises:
   selecting a blending pair that minimizes a cost function that is based on a tone reproduction error cost and a ratio error cost.

4. The method as recited by claim 3, further comprising:
   for each pixel in the transition region,
      computing an output pixel that takes the maximum of the two halftone patterns using the blending pair.

5. A system for creating an image to be printed, comprising:
   a computer processor;
   a halftone pattern selecting component configured for selecting a first halftone pattern for a first periodic clustered dot halftone region of the image to be printed wherein the first periodic clustered dot halftone region has a first frequency;
   the halftone pattern selecting component configured for selecting a second halftone pattern for a second periodic clustered dot halftone region of the image to be printed wherein the second periodic clustered dot halftone region has a second frequency and wherein one of the frequencies is higher than the other frequency;
   a transition region determiner component configured for determining a transition region that includes a boundary between the
      two halftone regions and includes additional portions of the two halftone regions beyond the boundary, wherein the additional portions are respective subsets of each of the two halftone regions and wherein a fixed width is used for the entire transition region; and
   a halftone pattern blending component configured for blending the two halftone patterns with each other in the transition region based on a blending ratio of the two halftone patterns that changes as a function of distance between the edges of the transition region, and wherein the halftone pattern blending component is further configured for selecting a blending pair that minimizes a cost function that is based on an absorptance cost and a ratio cost, and wherein the halftone pattern blending component is further configured to perform:
      for each pixel in the transition region,
         computing an output pixel that takes the maximum of the two halftone patterns using the blending pair.

6. The system of claim 5, wherein the halftone pattern blending component is further configured for controlling a strength of the blending ratio based on an angle between the boundary and a screen vector associated with a respective region.

7. The system of claim 6, wherein the halftone pattern blending component is further configured progressively making the blending ratio strength stronger as the angle approaches 0° and progressively making the blending ratio strength weaker as the angle moves away from 0°.

8. A non-transitory computer readable storage medium having computer-executable instructions stored thereon for causing a computer system to perform a method of creating an image to be printed, the method comprising:
   selecting a first halftone pattern for a first periodic clustered dot halftone region of the image to be printed wherein the first periodic clustered dot halftone region has a first frequency;
   selecting a second halftone pattern for a second periodic clustered dot halftone region of the image to be printed wherein the second periodic clustered dot halftone region has a second frequency and wherein one of the frequencies is higher than the other frequency;
   determining a transition region that includes a boundary between the
      two halftone regions and includes additional portions of the two halftone regions beyond the boundary wherein the additional portions are respective subsets of each of the two halftone regions and wherein a fixed width is used for the entire transition region; and
   blending the two halftone patterns with each other in the transition region based on a blending ratio of the two halftone patterns that changes as a function of distance between the edges of the transition region, wherein the blending of the two halftone patterns further comprises:

controlling a strength of the blending ratio based on an angle between the boundary and a screen vector associated with a respective region.

9. The non-transitory computer readable storage medium of claim 8, wherein the blending of the two halftone patterns further comprises:

selecting a blending pair that minimizes a cost function that is based on an absorptance cost and a ratio cost.

10. The non-transitory computer readable storage medium of claim 8, wherein the blending of the two halftone patterns further comprises:

controlling the blending ratio using a quantization operator to create n-level halftoned outputs where n varies between 1 and 255.

11. The non-transitory computer readable storage medium of claim 8, wherein the blending of the two halftone patterns further comprises:

blending the two halftone patterns using a low resolution approach.

* * * * *

UNITED STATES PATENT AND TRADEMARK OFFICE
CERTIFICATE OF CORRECTION

| | | |
|---|---|---|
| PATENT NO. | : 8,848,249 B2 | Page 1 of 1 |
| APPLICATION NO. | : 13/194764 | |
| DATED | : September 30, 2014 | |
| INVENTOR(S) | : Seong Jun Park et al. | |

It is certified that error appears in the above-identified patent and that said Letters Patent is hereby corrected as shown below:

In the Claims

In column 23, line 48, in Claim 1, delete "processors" and insert -- processors, --, therefor.

In column 24, line 62, in Claim 8, delete "boundary" and insert -- boundary, --, therefor.

Signed and Sealed this
Ninth Day of June, 2015

Michelle K. Lee
*Director of the United States Patent and Trademark Office*